US012771955B2

(12) United States Patent
Asakura

(10) Patent No.: US 12,771,955 B2
(45) Date of Patent: Oct. 20, 2026

(54) CAMERA SYSTEM AND CONTROL METHOD THEREFOR

(71) Applicant: Sony Semiconductor Solutions Corporation, Kanagawa (JP)

(72) Inventor: Luonghung Asakura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 104 days.

(21) Appl. No.: 18/993,968

(22) PCT Filed: Aug. 16, 2023

(86) PCT No.: PCT/JP2023/029574

§ 371 (c)(1),
(2) Date: Jan. 13, 2025

(87) PCT Pub. No.: WO2024/043150

PCT Pub. Date: Feb. 29, 2024

(65) Prior Publication Data

US 2026/0247042 A1 Aug. 20, 2026

(30) Foreign Application Priority Data

Aug. 24, 2022 (JP) ................................ 2022-133666

(51) Int. Cl.
*H04N 23/90* (2023.01)
*H04N 23/68* (2023.01)
(Continued)

(52) U.S. Cl.
CPC ......... *H04N 23/90* (2023.01); *H04N 23/6811* (2023.01); *H04N 25/443* (2023.01); *H04N 25/78* (2023.01)

(58) Field of Classification Search
CPC .. H04N 23/90; H04N 23/6811; H04N 25/443; H04N 25/78
See application file for complete search history.

(56) References Cited

U.S. PATENT DOCUMENTS 8,922,626 B2 * 12/2014 Aoki ...................... G01C 3/085 348/42
2014/0192037 A1 * 7/2014 Chung ................ G09G 3/2022 345/82
2020/0053266 A1 * 2/2020 Ogushi ............... G02B 7/1827

FOREIGN PATENT DOCUMENTS

JP 2009049870 A 3/2009
JP 2011061724 A * 3/2011
(Continued)

OTHER PUBLICATIONS

International Search Report (PCT/ISA/210), International Application No. PCT/JP2023/029574, dated Oct. 24, 2023.

*Primary Examiner* — Dramos Kalapodas
(74) *Attorney, Agent, or Firm* — Michael Best & Friedrich LLP

(57) ABSTRACT

Camera imaging elements with reduced power consumption are disclosed. In one example, a first imaging element of a camera system includes first pixel circuits that simultaneously sample and non-destructively read charges according to incident light photoelectrically converted in each pixel. A second imaging element includes second pixel circuits that simultaneously sample and non-destructively read charges according to incident light photoelectrically converted in each pixel. The first imaging element selectively outputs a pixel signal from at least some of the first pixel circuits within a frame period on the basis of a pixel signal output from some of the first pixel circuits or the second pixel circuits, and the second imaging element selectively outputs a pixel signal from at least some of the second pixel circuits within the frame period on the basis of a pixel signal output from some of the first pixel circuits or the second pixel circuits.

20 Claims, 15 Drawing Sheets

(51) Int. Cl.
*H04N 25/443* (2023.01)
*H04N 25/78* (2023.01)

(56) References Cited

FOREIGN PATENT DOCUMENTS

| | | | | |
|---|---|---|---|---|
| JP | 2012198075 A | | 10/2012 |
| JP | 2020028115 A | * | 2/2020 |

* cited by examiner

2: FIRST IMAGING ELEMENT

1: CAMERA SYSTEM

22: SECOND PIXEL CIRCUIT

1: CAMERA SYSTEM

CAMERA SYSTEM AND CONTROL METHOD THEREFOR

TECHNICAL FIELD

The present disclosure relates to a camera system and a control method therefor.

BACKGROUND ART

Since stereo cameras used in goggles, head-mounted displays, and the like are driven by batteries, it is desirable to suppress average power consumption and peak power.

For example, in the camera system disclosed in Patent Document 1, motion detection is performed using a low-resolution camera, and pixels in which a motion is detected are captured by a high-resolution camera, thereby reducing power consumption.

CITATION LIST

Patent Document

Patent Document 1: Japanese Patent Application Laid-Open No. 2012-198075

SUMMARY OF THE INVENTION

Problems to be Solved by the Invention

However, since the imaging of the high-resolution camera is started after the motion is detected, the imaging is performed by the high-resolution camera later than the imaging timing of the low-resolution camera. Therefore, there is a risk of failing to image fast-moving objects.

In addition, in Patent Document 1, when the high-resolution camera is driven, the low-resolution camera is also driven, so that the peak power increases, and the battery is deteriorated.

Therefore, the present disclosure provides a camera system having excellent responsiveness and capable of reducing power consumption.

Solutions to Problems

In order to solve the above problems, according to the present disclosure, there is provided a camera system including: a first imaging element;

a second imaging element; and a control section that controls the first imaging element and the second imaging element, in which the first imaging element includes a plurality of first pixel circuits that simultaneously samples charges according to incident light photoelectrically converted in each pixel and reads out the charges sampled in a non-destructive manner, the second imaging element includes a plurality of second pixel circuits that simultaneously samples charges according to incident light photoelectrically converted in each pixel and reads out the charges sampled in a non-destructive manner, the first imaging element switches whether or not to output a pixel signal from at least some first pixel circuits among the plurality of first pixel circuits within a same frame period on the basis of a pixel signal output from some of the first pixel circuits or some of the second pixel circuits for each frame period, and the second imaging element switches whether or not to output a pixel signal from at least some second pixel circuits among the plurality of second pixel circuits within a same frame period on the basis of a pixel signal output from the some first pixel circuits or the some second pixel circuits for each frame period.

The some first pixel circuits or the some second pixel circuits may be arranged at one or more pixel positions obtained by thinning out the plurality of first pixel circuits or the plurality of second pixel circuits in at least one of a first direction or a second direction.

The control section may include a feature detecting section that detects a feature including at least one of motion of a target object or presence of the target object on the basis of a pixel signal output from the some first pixel circuits or the some second pixel circuits for each frame period, the first imaging element may output a pixel signal from at least some first pixel circuits among the plurality of first pixel circuits within the frame period in which the feature is detected by the feature detecting section, and the second imaging element may output a pixel signal from at least some first pixel circuits among the plurality of first pixel circuits within the frame period in which the feature is detected by the feature detecting section.

The first imaging element may output a pixel signal from the plurality of first pixel circuits within the frame period in which the feature is detected by the feature detecting section, and the second imaging element may output a pixel signal from the plurality of second pixel circuits within the frame period in which the feature is detected by the feature detecting section.

The feature detecting section may detect the feature on the basis of a pixel signal output from the some first pixel circuits, and the first imaging element may output a pixel signal twice from the some first pixel circuits and output a pixel signal once from each of the first pixel circuits other than the some first pixel circuits within the frame period in which the feature is detected by the feature detecting section.

The first imaging element may stop outputting a pixel signal from the plurality of first pixel circuits during a frame period in which no feature is detected by the feature detecting section, and the second imaging element may stop outputting a pixel signal from the plurality of second pixel circuits during the frame period in which no feature is detected by the feature detecting section.

The control section may include an ROI setting section that sets a first region of interest (ROI) pixel region including one or more first pixel circuits in the plurality of first pixel circuits and sets a second ROI pixel region including one or more second pixel circuits in the plurality of second pixel circuits for each frame 10 period in accordance with a pixel position including the feature detected by the feature detecting section, the first imaging element may output a pixel signal in the first ROI pixel region within the same frame period, and the second imaging element may output a pixel signal in the second ROI pixel region within the same frame period.

The feature detecting section may detect the motion on the basis of a pixel signal output from the some first pixel circuits or the some second pixel circuits for each frame period, the first imaging element may output a pixel signal from at least some first pixel circuits among the plurality of first pixel circuits within a frame period in which the motion is detected, and the second imaging element may output a pixel signal from at least some second pixel circuits among the plurality of second pixel circuits within the frame period in which the motion is detected.

The feature detecting section may detect the motion on the basis of a pixel signal output from the some first pixel circuits or the some second pixel circuits for each frame period, the control section may include an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits, the first imaging element may output a pixel signal in the first ROI pixel region within a frame period in which the motion is detected, and the second imaging element may output a pixel signal in the second ROI pixel region within the frame period in which the motion is detected.

The control section may include:

a target object determination section that determines whether or not a target object is imaged on the basis of a pixel signal output from the some first pixel circuits or the some second pixel circuits for each frame period; and an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits in a case where it is determined that the target object is imaged, the first imaging element may output a pixel signal from the first pixel circuit in the first ROI pixel region within a frame period in which the target object is imaged, and the second imaging element may output a pixel signal from the second pixel circuit in the second ROI pixel region within the frame period in which the target object is imaged.

The control section may control pixel positions of the first ROI pixel region and the second ROI pixel region for each frame period to include the target object in accordance with a position of the target object.

Each of the plurality of first pixel circuits may include:

a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits may a second floating diffusion region that accumulates a charge corresponding to incident light photoelectrically converted by a second photoelectric conversion element;

a third capacitor that accumulates a charge according to a potential of the second floating diffusion region in a state where the charge of the second floating diffusion region is reset; and a fourth capacitor that accumulates a charge corresponding to incident light photoelectrically converted by the second photoelectric conversion element, and charges accumulated in the first capacitor, the second capacitor, the third capacitor, and the fourth capacitor may be held in a same frame period even after being read.

The first imaging element may switch whether or not to output a pixel signal from at least some first pixel circuits among the plurality of first pixel circuits within a same frame period on the basis of a pixel signal output from some of the first pixel circuits for each frame period, the second imaging element may switch whether or not to output a pixel signal from at least some second pixel circuits among the plurality of second pixel circuits within a same frame period on the basis of a pixel signal output from some of the first pixel circuits for each frame period, each of the plurality of first pixel circuits may a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits may include:

a second floating diffusion region that accumulates a charge corresponding to incident light photoelectrically converted by a second photoelectric conversion element; and a third capacitor that accumulates a charge in a state where the second floating diffusion region is reset or a charge according to incident light photoelectrically converted by the second photoelectric conversion element, charges accumulated in the first capacitor and the second capacitor may be held in a same frame even after being read, and the third capacitor may accumulate a charge in a state where the second floating diffusion region is reset within one frame period, and then accumulate a charge according to incident light photoelectrically converted by the second photoelectric conversion element.

The control section may shift a timing at which the first imaging element samples a charge according to incident light photoelectrically converted by first photoelectric conversion elements in at least some first pixel circuits among the plurality of first pixel circuits within the same frame period from a timing at which the second imaging element samples a charge according to incident light photoelectrically converted by second photoelectric conversion elements in at least some second pixel circuits among the plurality of second pixel circuits within the same frame period from each other.

The control section may shift a timing at which the first imaging element samples a reset level charge in at least some first pixel circuits among the plurality of first pixel circuits within the same frame period, a timing at which the first imaging element samples a charge according to incident light photoelectrically converted by the first photoelectric conversion element, a timing at which the second imaging element samples a reset level charge in at least some second pixel circuits among the plurality of second pixel circuits within the same frame period, and a timing at which the second imaging element samples a charge according to incident light photoelectrically converted by the second photoelectric conversion element from each other.

The control section may shift a timing at which the first imaging element outputs a pixel signal from at least some first pixel circuits among the plurality of first pixel circuits within the same frame period and a timing at which the second imaging element outputs a pixel signal from at least some second pixel circuits among the plurality of second pixel circuits within the same frame period from each other.

The control section may cause at least some first pixel circuits among the plurality of first pixel circuits to output a pixel signal within the same frame period, and then cause at least some second pixel circuits among the plurality of second pixel circuits to output a pixel signal within the same frame period.

The plurality of first pixel circuits may be arranged in each of a first direction and a second direction,

- the plurality of second pixel circuits may be arranged in each of the first direction and the second direction, and
- when outputting a pixel signal within the same frame period, the first imaging element and the second imaging element may alternately output a pixel signal for each pixel group arranged in the second direction.

The first imaging element and the second imaging element may have a same number of pixels, and

- the first imaging element and the second imaging element may perform exposure at a same exposure timing.

According to the present disclosure, there is provided a control method for a camera system including: a first imaging element including a plurality of first pixel circuits that simultaneously samples charges according to incident light photoelectrically converted in each pixel and reads out the charges sampled in a non-destructive manner;

- a second imaging element including a plurality of second pixel circuits that simultaneously samples charges according to incident light photoelectrically converted in each pixel and reads out the charges sampled in a non-destructive manner; and
- a control section that controls the first imaging element and the second imaging element,
- in which the first imaging element switches whether or not to output a pixel signal from at least some first pixel circuits among the plurality of first pixel circuits within a same frame period on the basis of a pixel signal output from some of the first pixel circuits or some of the second pixel circuits for each frame period, and
- the second imaging element switches whether or not to output a pixel signal from at least some second pixel circuits among the plurality of second pixel circuits within a same frame period on the basis of a pixel signal output from the some first pixel circuits or the some second pixel circuits for each frame period.

MODE FOR CARRYING OUT THE INVENTION

Hereinafter, embodiments of a camera system will be described with reference to the drawings. Although the main components of the camera system will be mainly described below, the camera system may have components and functions that are not illustrated or described. The following description does not exclude components and functions that are not illustrated or described.

Figure 1:
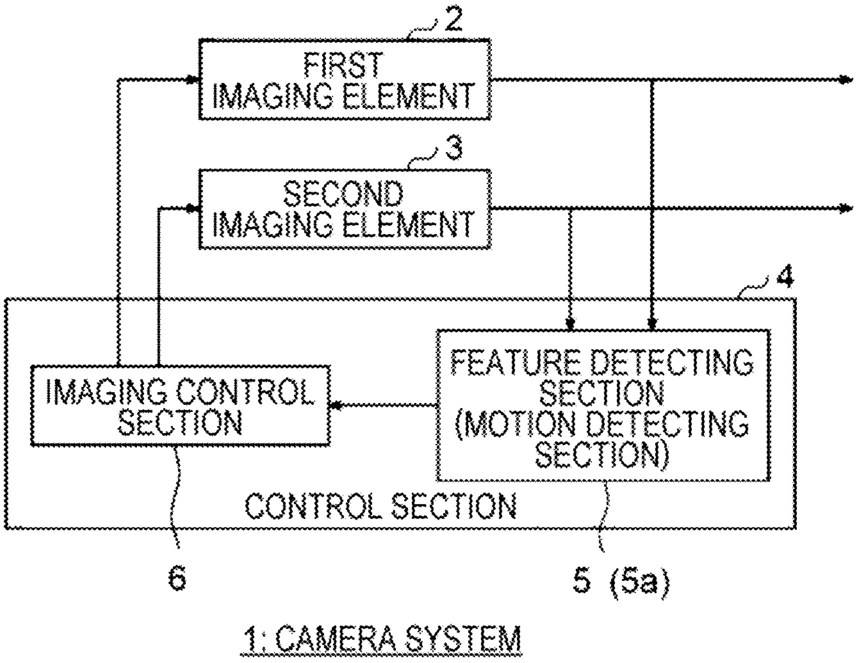
FIG. 1 is a block diagram illustrating a schematic configuration of a camera system according to a first embodiment.

(First Embodiment) FIG. 1 is a block diagram illustrating a schematic configuration of a camera system 1 according to a first embodiment. The camera system 1 of FIG. 1 includes at least two imaging elements, and can constitute a stereo camera. Note that FIG. 1 illustrates a minimum configuration of the camera system 1 according to the first embodiment, and may include components not illustrated in FIG. 1. For example, the camera system 1 according to the first embodiment may include a signal processing circuit, a distance measuring circuit, an image processing circuit, or the like. Hereinafter, the configuration and operation of the camera system 1 according to the first embodiment will be described with reference to FIG. 1.

The camera system 1 in FIG. 1 includes a first imaging element 2, a second imaging element 3, and a control section 4. The first imaging element 2 and the second imaging element 3 have the same number of pixels, and perform imaging at the same exposure timing. For example, the first imaging element and the second imaging element 3 can image the same subject and generate a parallax image. The parallax image can be used, for example, to measure the distance of the subject.

Hereinafter, as an example, an example in which the first imaging element 2 is arranged on the left side and the second imaging element 3 is arranged on the right side with respect to the incident direction of the incident light will be described, but arrangement positions of the first imaging element 2 and the second imaging element 3 are arbitrary.

The first imaging element 2 and the second imaging element 3 may perform photoelectric conversion in a visible-light band or may perform photoelectric conversion in an infrared-light band. In a case where the first imaging element 2 and the second imaging element 3 perform photoelectric conversion in a visible-light band, a color image may be captured, or a monochrome image may be captured.

The first imaging element 2 includes a plurality of first pixel circuits that simultaneously samples charges corresponding to incident light photoelectrically converted by each pixel in all pixels and reads out the sampled charges in a non-destructive manner. The second imaging element 3 includes a plurality of second pixel circuits that simultaneously samples charges corresponding to incident light photoelectrically converted by each pixel in all pixels and reads out the sampled charges in a non-destructive manner. Since the first pixel circuit included in the first imaging element 2 and the pixel circuit included in the second imaging element 3 have the same circuit configuration, in the present specification, the first pixel circuit and the second pixel circuit may be collectively referred to simply as pixel circuit.

Both the first imaging element 2 and the second imaging element 3 are global shutter scheme imaging elements that simultaneously perform imaging in all pixels. By adopting the global shutter scheme, distortion of a captured image can be suppressed, and for example, distance accuracy when distance measurement is performed using the first imaging element 2 and the second imaging element 3 can be improved.

Furthermore, each pixel circuit of the first imaging element 2 and the second imaging element 3 has a circuit configuration of a so-called voltage domain scheme as described later. By providing a circuit configuration of a voltage domain scheme, miniaturization is facilitated, and high resolution can be realized.

The control section 4 controls the first imaging element 2 and the second imaging element 3. More specifically, the control section 4 controls exposure timings, charge transfer timings, and pixel signal reading timings of the first imaging element 2 and the second imaging element 3.

The control section 4 includes a feature detecting section 5 and an imaging control section 6. The feature detecting section 5 detects a feature including at least one of the motion of the target object or the presence of the target object on the basis of pixel signals output from some first pixel circuits or some second pixel circuits for each frame period.

The first imaging element 2 outputs pixel signals from at least some first pixel circuits of the plurality of first pixel circuits within a frame period in which a feature is detected by the feature detecting section 5. The second imaging element 3 outputs pixel signals from at least some first pixel circuits among the plurality of first pixel circuits within a frame period in which a feature is detected by the feature detecting section 5.

For example, the first imaging element 2 can output the pixel signals from the first pixel circuits of all the pixels within the frame period in which the feature is detected by the feature detecting section 5. Similarly, the second imaging element 3 can output pixel signals from the second pixel circuits of all the pixels within the frame period in which the feature is detected by the feature detecting section 5.

In a case where the feature detecting section 5 detects the feature on the basis of the pixel signals output from some of the first pixel circuits, the first imaging element 2 outputs the pixel signals twice from some of the first pixel circuits and outputs the pixel signals once from the first pixel circuits other than the some of the first pixel circuits within the frame period in which the feature is detected by the feature detecting section 5. As described above, some of the first pixel circuits in the first imaging element 2 perform double reading to output pixel signals twice in one frame period. The reason why such double reading is possible is that the first pixel circuit has a circuit configuration of a voltage domain scheme.

The first imaging element 2 stops outputting pixel signals from the plurality of first pixel circuits during a frame period in which no feature is detected by the feature detecting section 5. Similarly, the second imaging element 3 stops outputting the pixel signals from the plurality of second pixel circuits during a frame period in which no feature is detected by the feature detecting section 5. As described above, since the pixel signals are not output from the first imaging element 2 and the second imaging element 3 during the frame period in which no feature is detected, power consumption can be reduced.

A specific example of the feature detecting section 5 is a motion detecting section 5*a*. Hereinafter, an example in which the feature detecting section 5 is the motion detecting section 5*a* will be mainly described. The motion detecting section 5*a* detects the motion of the target object on the basis of the pixel signals output from some of the first pixel circuits or some of the second pixel circuits. The target object is arbitrary, and when some motion is detected in at least some pixels in image data generated on the basis of pixel signals output from some first pixel circuits or some second pixel circuits, the motion detecting section 5*a* outputs a signal (hereinafter, it may be referred to as a motion detection signal) indicating that the motion is detected.

The motion detection signal output from the motion detecting section 5*a* is input to the imaging control section 6 in the control section 4. The imaging control section 6 controls exposure timing, sampling timing, output timing of pixel signals, or the like of the first imaging element 2 and the second imaging element 3 on the basis of the motion detection signal.

Figure 2:
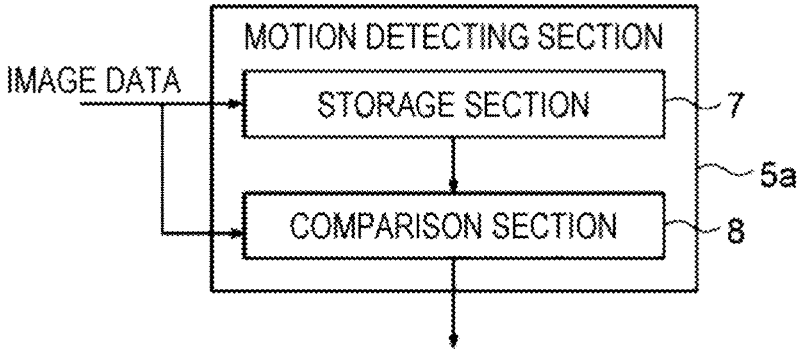
FIG. 2 is a block diagram illustrating an example of an internal configuration of a motion detecting section.

FIG. 2 is a block diagram illustrating an example of an internal configuration of the motion detecting section 5*a*. The motion detecting section 5*a* includes a storage section 7 and a comparison section 8. FIG. 2 illustrates an example in which motion detection is performed on the basis of image data output from the first imaging element 2. The frame-based image data output from the first imaging element 2 is input to the storage section 7 and the comparison section 8. The storage section 7 stores image data one frame before. The comparison section 8 compares the image data output from the first imaging element 2 with the image data of one frame before read from the storage section 7, and detects a difference between the two pieces of image data as a motion.

Figure 3:
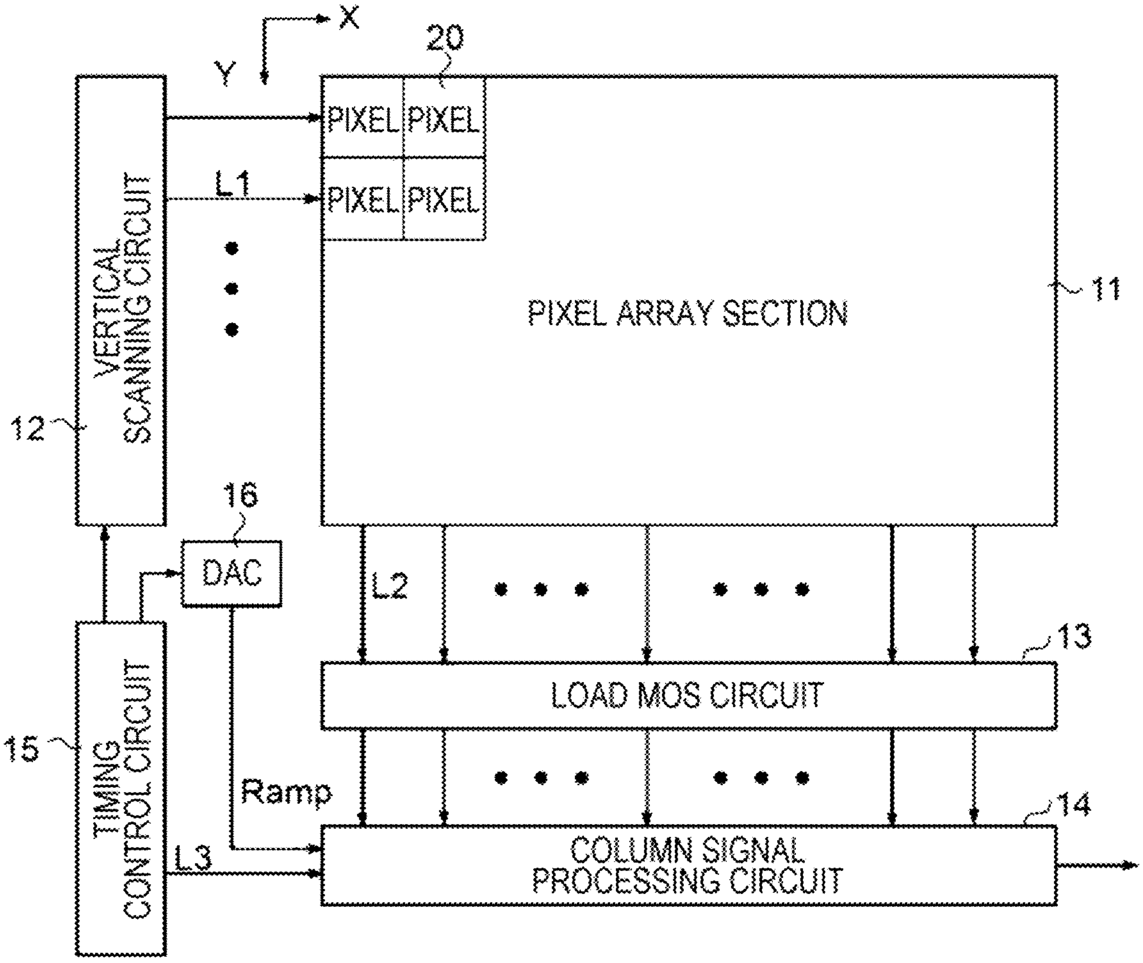
FIG. 3 is a block diagram illustrating a schematic configuration of a first imaging element.

FIG. 3 is a block diagram illustrating a schematic configuration of the first imaging element 2. Since the second imaging element 3 has the same block configuration as the first imaging element 2, the configuration of the first imaging element 2 will be mainly described below.

As illustrated in FIG. 3, the first imaging element 2 includes a pixel array section 11, a vertical scanning circuit 12, a load metal oxide semiconductor (MOS) circuit 13, a column signal processing circuit 14, a timing control circuit 15, and a digital-to-analog converter (DAC) 16.

The pixel array section 11 includes a plurality of pixels arranged in the first direction X and the second direction Y. In the present specification, the first direction X may be referred to as a row direction, and the second direction Y may be referred to as a column direction. Furthermore, in the present specification, a pixel group of one row is referred to as a pixel row, and a pixel group of one column is referred to as a pixel column.

The timing control circuit 15 controls operation timings of the vertical scanning circuit 12, the DAC 16, and the column signal processing circuit 14 in synchronization with the vertical synchronization signal XVS supplied from the control section 4. The DAC 16 generates a ramp signal Ramp used when analog-digital conversion (hereinafter, AD conversion) is performed in the column signal processing circuit 14. The ramp signal Ramp is, for example, a sawtooth signal.

The vertical scanning circuit 12 sequentially drives the plurality of row scanning lines L1. The row scanning line L1 is provided for each pixel row arranged in the second direction Y, and when the vertical scanning circuit 12 drives any one of the row scanning lines L1, a pixel signal from each pixel in the corresponding pixel row is sent to the plurality of vertical signal lines L2. The plurality of pixel signals on the plurality of vertical signal lines L2 is input to the column signal processing circuit 14 via the load MOS circuit 13.

As described later, the load MOS circuit 13 includes a constant current source that supplies a constant current to each vertical signal line L2.

The column signal processing circuit 14 performs AD conversion on the pixel signal on each vertical signal line L2 for each vertical signal line L2, and performs correlated double sampling (CDS) processing on the digital pixel signal after the AD conversion. In the present specification, the output of the column signal processing circuit 14 is referred to as image data. The image data is frame-based image data captured in a part or the entire region of the pixel array section 11.

Both the first imaging element 2 and the second imaging element 3 have a plurality of pixels 20. Each pixel 20 in the first imaging element 2 includes a first photoelectric conversion element and a first pixel circuit. Each pixel 20 in the second imaging element 3 includes a second photoelectric conversion element and a second pixel circuit.

Figure 4:
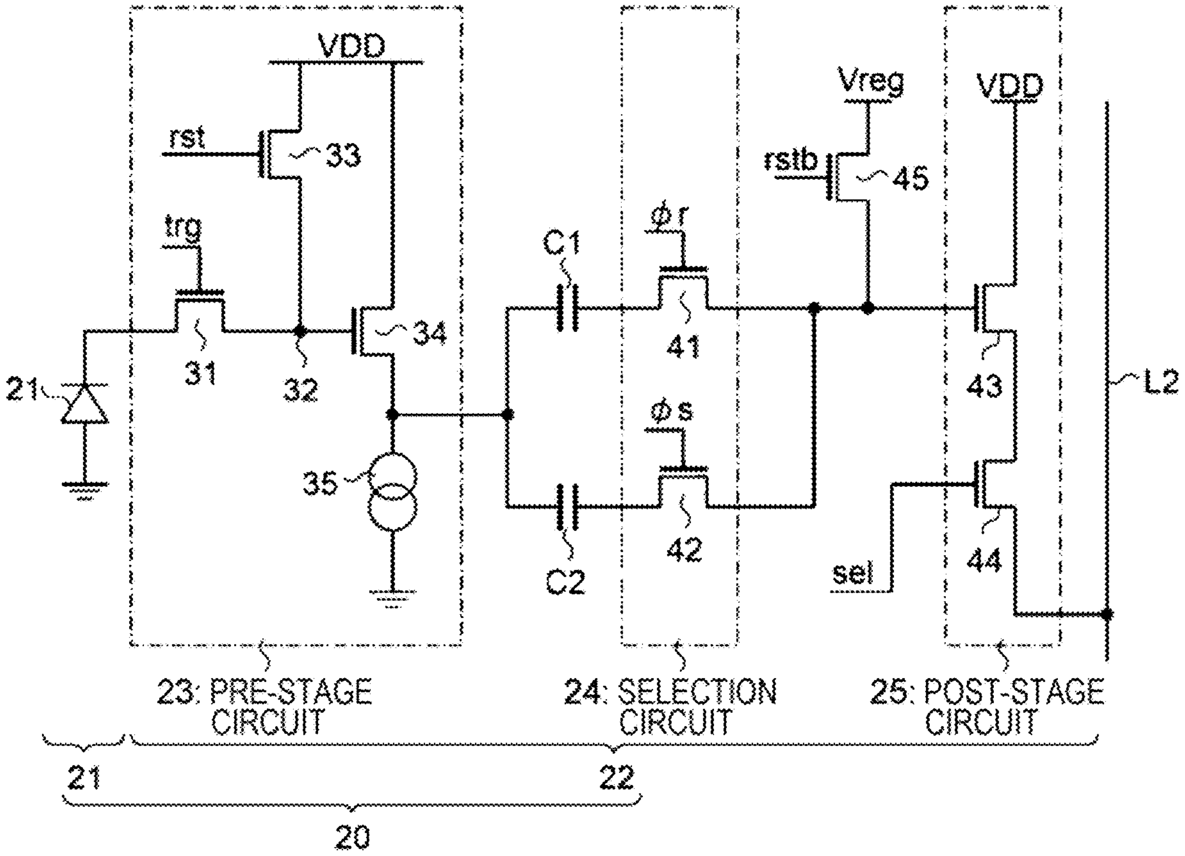
FIG. 4 is a circuit diagram of each pixel in a pixel array section.

FIG. 4 is a circuit diagram of each pixel 20 in the pixel array section 11. The pixel 20 includes a photoelectric conversion element 21 and a pixel circuit 22. The pixel 20 in FIG. 4 is applicable to both the pixel 20 in the first imaging element 2 and the pixel 20 in the second imaging element 3, and is a pixel 20 of a global shutter scheme and a voltage domain scheme.

The pixel circuit 22 in the pixel 20 in FIG. 4 includes a pre-stage circuit 23, a selection circuit 24, and a post-stage circuit 25.

The pre-stage circuit 23 is connected to the photoelectric conversion element 21, and includes a transfer transistor 31, a floating diffusion region (hereinafter, referred to as a floating diffusion or FD) 32, a first reset transistor 33, a first amplification transistor 34, and a current source 35.

The photoelectric conversion element 21 accumulates a charge corresponding to incident light by photoelectric conversion. The transfer transistor 31 transfers a charge from the photoelectric conversion element 21 to the FD 32 in accordance with a transfer signal trg from the vertical scanning circuit 12. In accordance with a reset signal from the vertical scanning circuit 12, the first reset transistor 33 extracts charge from the FD 32 to initialize the voltage of the FD 32. The FD 32 accumulates a reset level charge or a charge corresponding to incident light photoelectrically converted by the photoelectric conversion element 21, and generates a voltage corresponding to the accumulated charge. The power supply voltage VDD is applied to the drain of the first amplification transistor 34, and the current source 35 and the output node of the pre-stage circuit 23 are connected to the source of the first amplification transistor 34.

One end of the first capacitor C1 and one end of the second capacitor C2 are connected to an output node of the pre-stage circuit 23. The first capacitor C1 is used to hold (sample) a reset level charge of the FD 32, and the second capacitor C2 is used to hold (sample) a charge corresponding to incident light photoelectrically converted by the photoelectric conversion element 21. Hereinafter, a charge corresponding to incident light photoelectrically converted by the photoelectric conversion element 21 may be referred to as a signal charge.

The selection circuit 24 includes a first selection transistor 41 and a second selection transistor 42. The post-stage circuit 25 includes a second amplification transistor 43 and a third selection transistor 44.

The first selection transistor 41 switches whether or not to connect the other end of the first capacitor C1 to the gate of the second amplification transistor 43 in the post-stage circuit 25 according to the first selection signal φr from the vertical scanning circuit 12. The second selection transistor 42 switches whether or not to connect the other end of the second capacitor C2 to the gate of the second amplification transistor 43 in the post-stage circuit 25 according to the second selection signal φs from the vertical scanning circuit 12.

The second reset transistor 45 is connected to a signal path connecting the other end of the first capacitor C1, the other end of the second capacitor C2, and the gate of the second amplification transistor 43. The second reset transistor 45 switches whether or not to initialize the above-described signal path to the power supply voltage level in accordance with the second reset signal rstb from the vertical scanning circuit 12.

At the start of exposure, the vertical scanning circuit 12 supplies a first reset signal rst at a high level and a transfer signal at a high level to all the pixels 20 in the pixel array section 11. As a result, the photoelectric conversion elements 21 of all the pixels 20 are initialized. Thereafter, immediately before the exposure ends, the vertical scanning circuit 12 turns on the first reset transistor 33 to extract the charge of the FD 32, and sets the potential of the FD 32 to the reset level. In addition, by turning on both the second reset transistor 45 and the first selection transistor 41, a charge corresponding to the reset level of the FD 32 is held in the first capacitor C1.

At the end of exposure, the vertical scanning circuit 12 turns on both the second reset transistor 45 and the second selection transistor 42 and turns on the transfer transistor 31 for a predetermined time for all the pixels 20 in the pixel array section 11. As a result, the signal charge corresponding to the exposure amount is transferred to the FD 32 through the transfer transistor 31 and accumulated therein. Charges corresponding to the amount of incident light are accumulated in the FD 32, and the FD 32 has a potential corresponding to the accumulated capacitance. Furthermore, the second capacitor C2 holds a signal charge corresponding to the amount of incident light.

In this manner, the first imaging element 2 and the second imaging element 3 simultaneously start exposure of all the pixels 20 in each pixel array section 11, and perform imaging by the global shutter scheme for simultaneously ending the exposure. Furthermore, each of the first imaging element 2 and the second imaging element 3 includes a pixel circuit (first pixel circuit and second pixel circuit) 22 having a circuit configuration of a voltage domain scheme that holds a charge according to a reset level of the FD 32 in the first capacitor C1 in each pixel 20 and holds a signal charge according to incident light in the second capacitor C2.

The vertical scanning circuit 12 sequentially selects each pixel row in the pixel array section 11 after the exposure is completed. As a result, the pixel signal of the reset level corresponding to the held charge of the first capacitor C1 of each pixel 20 included in the selected pixel row and the pixel signal of the signal charge level corresponding to the held charge of the second capacitor C2 are sequentially output to the corresponding vertical signal line L2.

Figure 5:
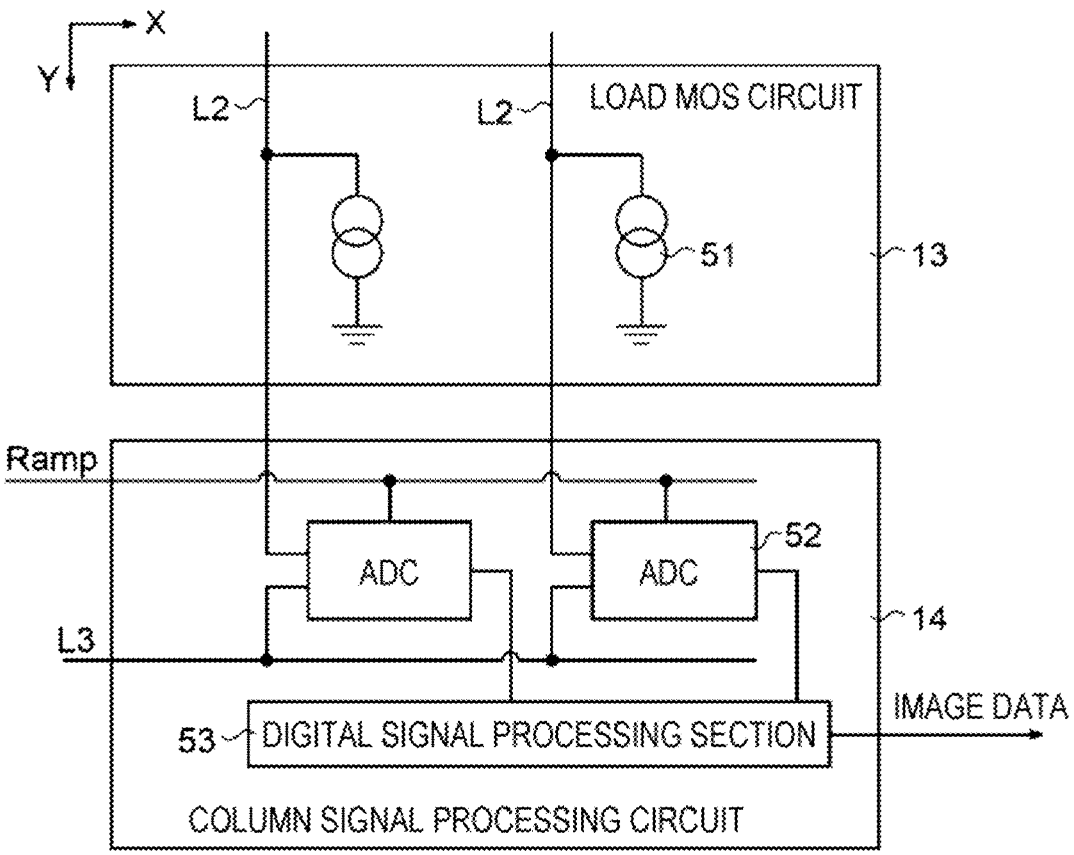
FIG. 5 is a block diagram illustrating internal configurations of a load MOS circuit and a column signal processing circuit illustrated in FIG. 3.

FIG. 5 is a block diagram illustrating internal configurations of the load MOS circuit 13 and the column signal processing circuit 14 illustrated in FIG. 3. The load MOS circuit 13 includes a plurality of current sources 51 each connected to a plurality of vertical signal lines L2 arranged in the first direction X and extending in the second direction Y. Each vertical signal line L2 is provided for each pixel column extending in the second direction Y. Each current source 51 supplies a constant current to the corresponding vertical signal line L2.

The column signal processing circuit 14 includes a plurality of analog-to-digital converters (hereinafter, ADC) 52 and a digital signal processing section 53. The plurality of ADCs 52 is provided in association with the plurality of vertical signal lines L2. The ADC 52 converts the pixel signal on the corresponding vertical signal line L2 into a digital pixel signal using the ramp signal Ramp from the DAC 16 illustrated in FIG. 3 in synchronization with the control signal L3 from the timing control circuit 15 illustrated in FIG. 3. The digital pixel signal output from the ADC 52 is supplied to the digital signal processing section 53. The ADC 52 is, for example, a single-slope ADC 52 having a comparator and a counter.

The digital signal processing section 53 performs signal processing such as CDS processing between a reset level pixel signal and a signal charge pixel signal for each vertical signal line L2, and outputs image data. The digital signal processing section 53 outputs image data in units of frames.

Figure 6:
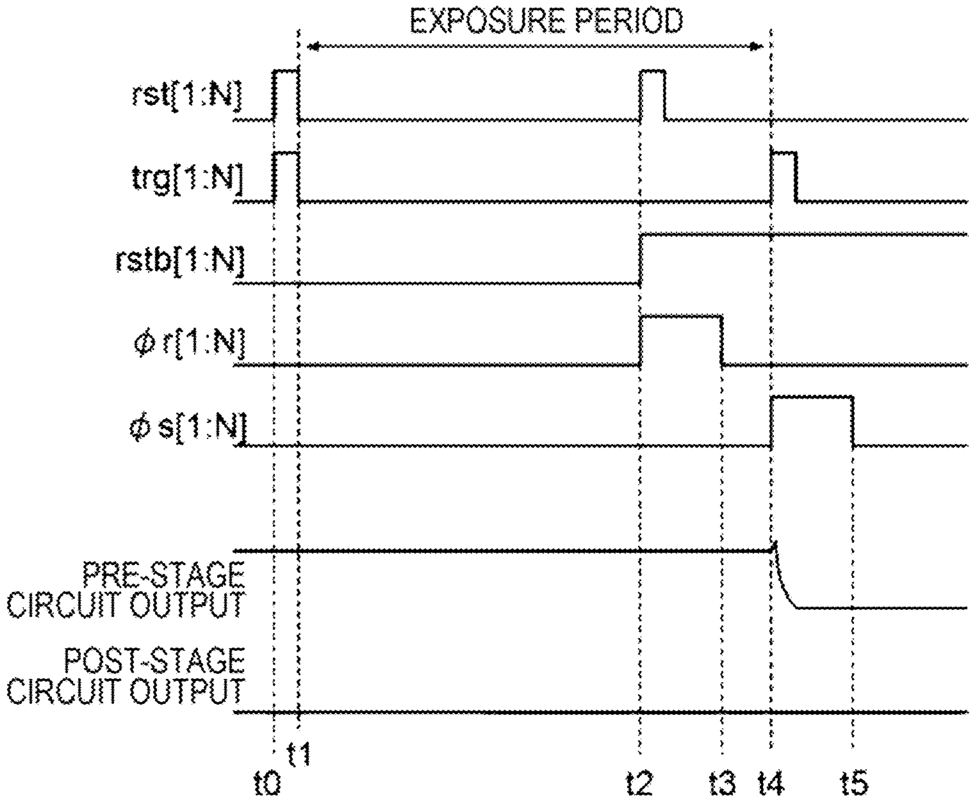
FIG. 6 is a timing chart of global shutter operations of the first imaging element and a second imaging element.

FIG. 6 is a timing chart of global shutter operations of the first imaging element 2 and the second imaging element 3. The vertical scanning circuit 12 sets both the first reset signal rst and the transfer signal trg to the high level in a period from the time to immediately before the exposure start to the exposure start time t1. As a result, both the first reset transistor 33 and the transfer transistor 31 are turned on, all the pixels 20 in the pixel array section 11 are reset, the charge of the FD 32 is extracted, and the potential of the FD 32 becomes the reset level. FIG. 6 illustrates an example in which there are N pixel rows in the pixel array section 11. In FIG. 6, [1:N] is written at the end of the signal input to each pixel circuit of the N pixel rows, but this description is omitted in the present specification.

At time t1, both the first reset transistor 33 and the transfer transistor 31 are turned off, and exposure is started. Thereafter, at time t2 immediately before the end of the exposure period, the vertical scanning circuit 12 sets both the second reset signal rstb and the first selection signal φr to the high level and sets the first reset signal rst to the high level for all the pixels 20 in the pixel array section 11. As a result, the potentials of the FDs 32 of all the pixels 20 are initialized to the reset level, and charges according to the reset level are held (sampled) in the first capacitor C1.

Thereafter, at time t3, the first selection signal or transitions from the high level to the low level, and the first selection transistor 41 is turned off. As a result, the sampling period of the first capacitor C1 ends.

Thereafter, at time t4, the transfer signal trg temporarily goes to a high level, and the transfer transistor 31 is temporarily turned on. As a result, the charge corresponding to the incident light photoelectrically converted by the photoelectric conversion element 21 is transferred to the FD 32 through the transfer transistor 31. As the amount of incident light increases, the signal charge transferred to the FD 32 increases, and the voltage of the FD 32 decreases.

Furthermore, at time t4, the second selection signal φs goes to a high level, and the second selection transistor 42 is turned on. As a result, the second capacitor C2 holds (samples) the charge according to the signal charge of the FD 32. Thereafter, at time t5, the second selection signal φs becomes the low level, and the sampling period of the second capacitor C2 ends.

Figure 7:
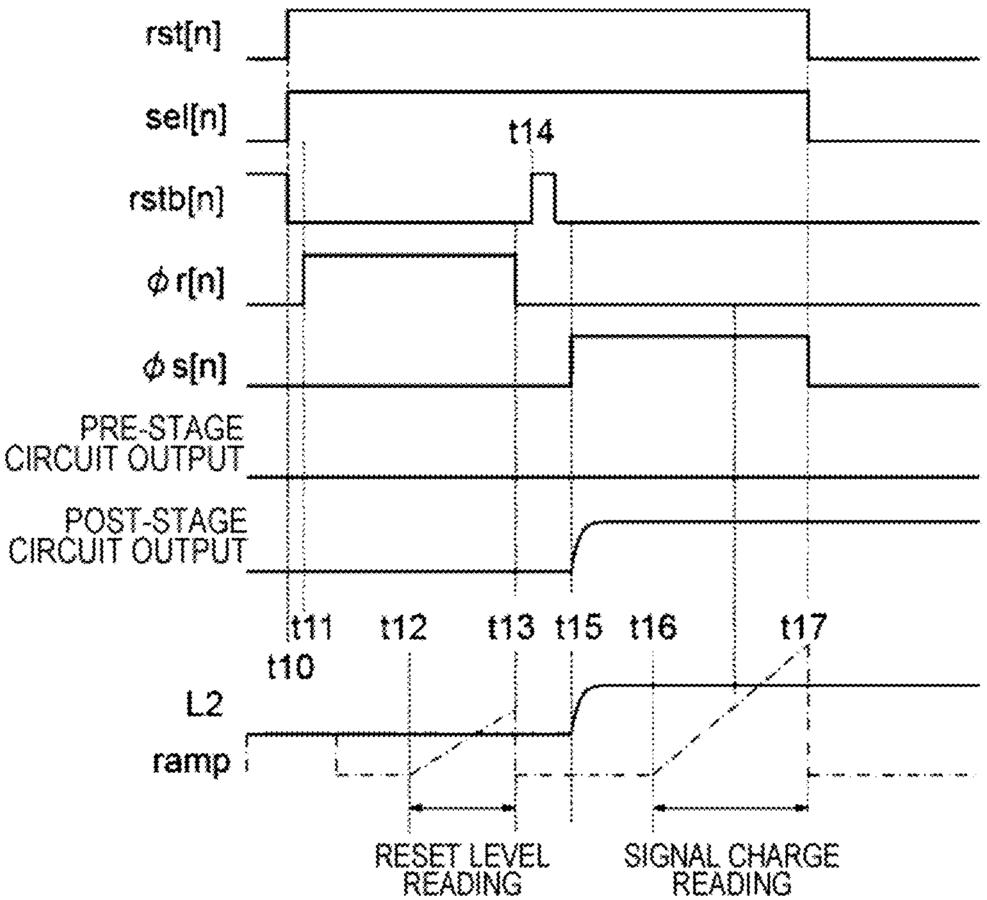
FIG. 7 is a timing chart of a pixel signal read operation in the first imaging element and the second imaging element.

FIG. 7 is a timing chart of a pixel signal read operation in the first imaging element 2 and the second imaging element 3. FIG. 7 illustrates timing in a case where the read operation of the nth pixel row among the N pixel rows is performed. In FIG. 7, [n] is written at the end of the signal input to each pixel circuit of the nth pixel row, but this description is omitted in the present specification.

At time t10, the vertical scanning circuit 12 sets the first reset signal rst of each pixel 20 in the nth pixel row to the high level, the third selection signal sel input to the gate of the third selection transistor 44 to the high level, the second reset signal rstb to the low level, and the first selection signal φr to the high level. As a result, the potential of the FD 32 is initialized to the reset level, and a voltage corresponding to the held charge of the first capacitor C1 is supplied to the gate of the second amplification transistor 43. At this time, since the third selection transistor 44 is turned on, a pixel signal having a voltage level corresponding to the gate voltage of the second amplification transistor 43 in each pixel circuit in the nth pixel row is supplied to the vertical signal line L2.

At time t13, the first selection signal φr goes to a low level, and the first selection transistor 41 is turned off. Thereafter, at time t14, the second reset signal rstb temporarily goes to a high level, and the second reset transistor 45 is turned on. Therefore, the other end sides of the first capacitor C1 and the second capacitor C2 increase to the power supply voltage level.

Thereafter, at time t15, the second selection signal φs goes to a high level, and the second selection transistor 42 is turned on. As a result, a voltage corresponding to the held charge of the second capacitor C2 is supplied to the gate of the second amplification transistor 43. At this time, since the third selection transistor 44 is on, a pixel signal of a voltage level corresponding to the gate voltage of the second amplification transistor 43 in each pixel circuit in the nth pixel row is supplied to the vertical signal line L2.

As indicated by a broken line in FIG. 7, the voltage level of the ramp signal Ramp input to the DAC 16 gradually increases from time t16 to time t17. The ADC 52 compares the ramp signal Ramp with the pixel signal on the vertical signal line L2, and counts a period until the comparison result is inverted with a counter (not illustrated). A digital pixel signal is generated on the basis of the count value of the counter.

Figure 8:
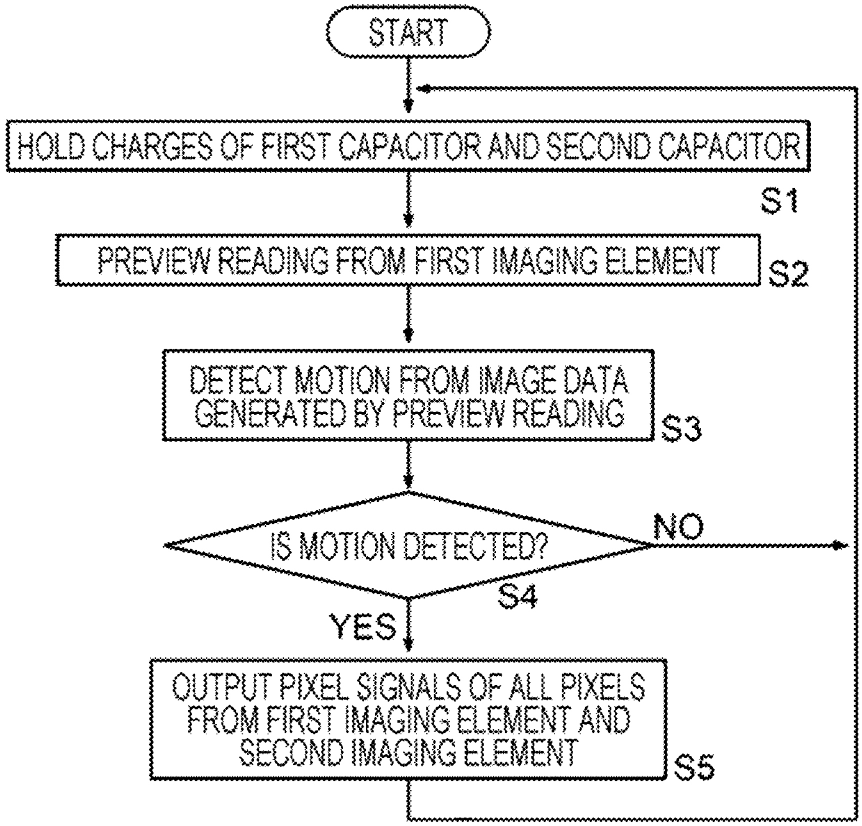
FIG. 8 is a flowchart illustrating a processing operation of the camera system according to the first embodiment.

FIG. 8 is a flowchart illustrating a processing operation of the camera system 1 according to the first embodiment. When a shutter button (not illustrated) is pressed, the camera system 1 starts the processing operation of the flowchart of FIG. 8.

First, the first imaging element 2 and the second imaging element 3 simultaneously start exposure, and for each pixel 20, the first capacitor C1 illustrated in FIG. 4 holds a reset level charge and the second capacitor C2 holds a signal charge (step S1). As described above, in step S1, the first imaging element 2 and the second imaging element 3 simultaneously perform the operation in the period from time t0 to time t5 in FIG. 6 for each of the pixels 20 for all the pixels 20.

Next, pixel signals of at least some of the pixels 20 are read from one of the first imaging element 2 and the second imaging element 3 (step S2). In the present specification, reading of the pixel signal in step S2 is referred to as preview reading. Hereinafter, an example in which preview reading is performed from the first imaging element 2 will be described, but preview reading may be performed from the second imaging element 3.

In the preview reading, the pixel signals of all the pixels 20 of the pixel array section 11 in the first imaging element 2 are not read, but the pixel signals of some pixels 20 thinned out from all the pixels 20 are read. A method of thinning out the pixels 20 is arbitrary. For example, the pixel signals of some pixels 20 selected for every plurality of pixels in the first direction X and the second direction Y may be read from all the pixels 20.

The reason why the pixel signals of some pixels 20 thinned out from all the pixels 20 in step S2 are read out is to reduce power consumption and to speed up the motion detection processing. The pixel signal read from the pixel array section 11 is converted into a digital pixel signal by the column signal processing circuit 14. The column signal processing circuit 14 performs CDS processing using the digital pixel signal at the reset level and the digital pixel signal corresponding to the signal charge to generate image data. The image data output from the column signal processing circuit 14 is input to the motion detecting section 5*a* in the control section 4 in FIG. 1.

The motion detecting section 5*a* detects a moving pixel 20 on the basis of the image data based on the pixel signals of some pixels 20 read in step S2 (step S3). Next, it is determined whether or not there is a moving pixel 20 on the basis of the detection result of step S3 (step S4). In a case where there is no moving pixel 20, the processing in and after step S1 is repeated. In a case where there is a moving pixel 20, pixel signals of all the pixels 20 of the pixel array section 11 are output in both the first imaging element 2 and the second imaging element 3 (step S5). The processing of step S5 is referred to as main reading in the present specification. In the main reading according to the present embodiment, both the first imaging element 2 and the second imaging element 3 output the pixel signals of all the pixels 20.

Since charges are held in the first capacitor C1 and the second capacitor C2 when the processing of step S1 is first performed, when the determination of step S4 is YES and main reading is performed, it is only necessary to output a pixel signal corresponding to the held charges of the first capacitor C1 and the second capacitor C2, and the pixel signal can be quickly output. When the processing of step S5 ends, the processing of step S1 and subsequent steps is repeated.

Note that the main reading in step S5 is performed only in a case where there is a motion in at least a part of the image data. In other words, in a case where no motion is detected in the image data generated by the preview reading, the main reading is not performed, so that the frequency of the main reading can be reduced, and the power consumption can be reduced.

Since the pixel circuit 22 according to the present embodiment has the circuit configuration of the voltage domain scheme, even if the held charges in the first capacitor C1 and the second capacitor C2 are read for preview reading, the charges remain held in the first capacitor C1 and the second capacitor C2. Therefore, in a case where YES is determined in step S4, the held charges can be read from the first capacitor C1 and the second capacitor C2 a plurality of times within the same frame period.

Figure 9:
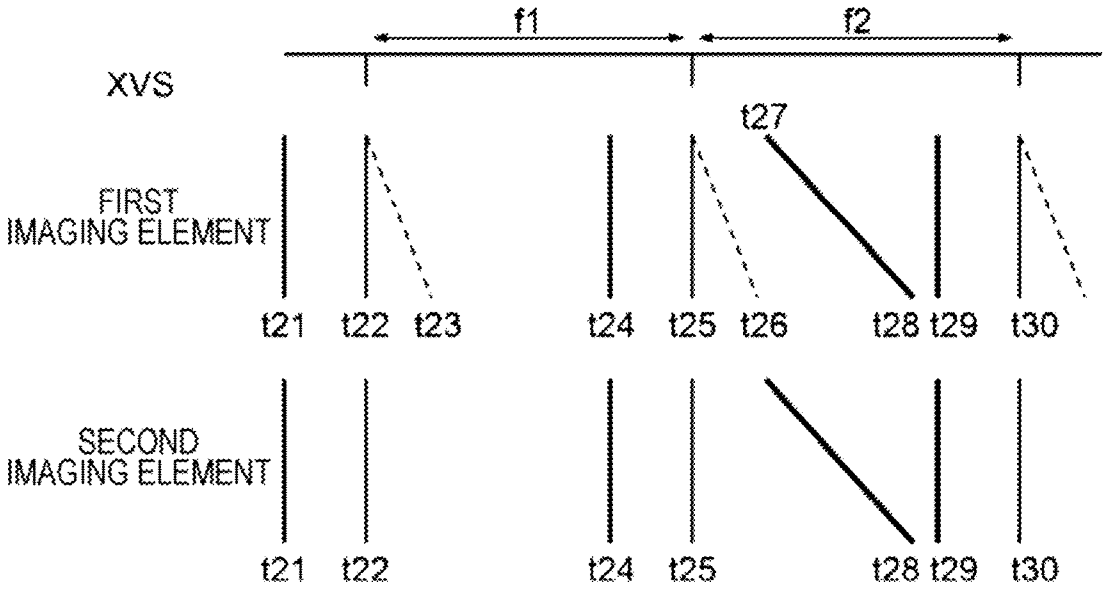
FIG. 9 is a schematic operation timing diagram of the camera system according to the first embodiment.

FIG. 9 is a schematic operation timing diagram of the camera system 1 according to the first embodiment. FIG. 9 illustrates the timing at which the signal charge is held in the second capacitor C2 and read, and omits the timing at which the reset level of the FD 32 is held in the first capacitor C1 and read. The upper part of FIG. 9 illustrates the operation timing of the first imaging element 2 that performs preview reading and main reading, and the lower part illustrates the operation timing of the second imaging element 3 that performs main reading without performing preview reading.

At time t21, the first imaging element 2 and the second imaging element 3 simultaneously start exposure. At time t22, the exposure ends, and the first imaging element 2 and the second imaging element 3 simultaneously hold (sample) signal charges in the second capacitor C2. During a period from time t22 to time t23, the first imaging element 2 performs preview reading.

As described above, the image data based on the preview-read pixel signal is sent to the motion detecting section 5*a* in the control section 4. The motion detecting section 5*a* performs motion detection in a period from time t23 to time t24.

In a case where no motion is detected, both the first imaging element 2 and the second imaging element 3 do not perform main reading within the frame. In the frame f1 of FIG. 9, since no motion is detected in the preview reading, the main reading is not performed.

At time t24, exposure for the next frame f2 is started. The exposure ends at time t25, and the first imaging element 2 and the second imaging element 3 simultaneously hold (sample) signal charges in the second capacitor C2. During a period from time t25 to time t26, the first imaging element 2 performs preview reading. During a period from time t26 to time t27, the motion detecting section 5*a* detects the motion of the image data based on the preview-read pixel signal. As a result, when the motion is detected, both the first imaging element 2 and the second imaging element 3 perform main reading of reading pixel signals for all the pixels.

As described above, according to the first embodiment, in the camera system including the first imaging element 2 and the second imaging element 3 including the pixel circuits (the first pixel circuit and the second pixel circuit) 22 having the circuit configuration of the global shutter scheme and the voltage domain scheme, the motion detection is performed on the image data generated by performing the preview reading in one of the first imaging element 2 and the second imaging element 3, and the main reading is performed in which the pixel signals of all the pixels 20 are read in both the first imaging element 2 and the second imaging element 3 only in a case where the motion is detected. Since main reading is not performed unless motion is detected in preview reading, power consumption can be reduced.

In addition, since the pixel circuit 22 according to the present embodiment has the circuit configuration of the voltage domain scheme, even if charges held in the first capacitor C1 and the second capacitor C2 are read out for preview reading, the charges are held as they are. Therefore, charges can be read out again from the first capacitor C1 and the second capacitor C2 for main reading in the same frame, and main reading can be quickly performed after preview reading.

(Second Embodiment) In the first embodiment, the pixel signals of all the pixels 20 are read out at the time of main reading, but the pixel signals of some of the pixels 20 may be read out.

Figure 10:
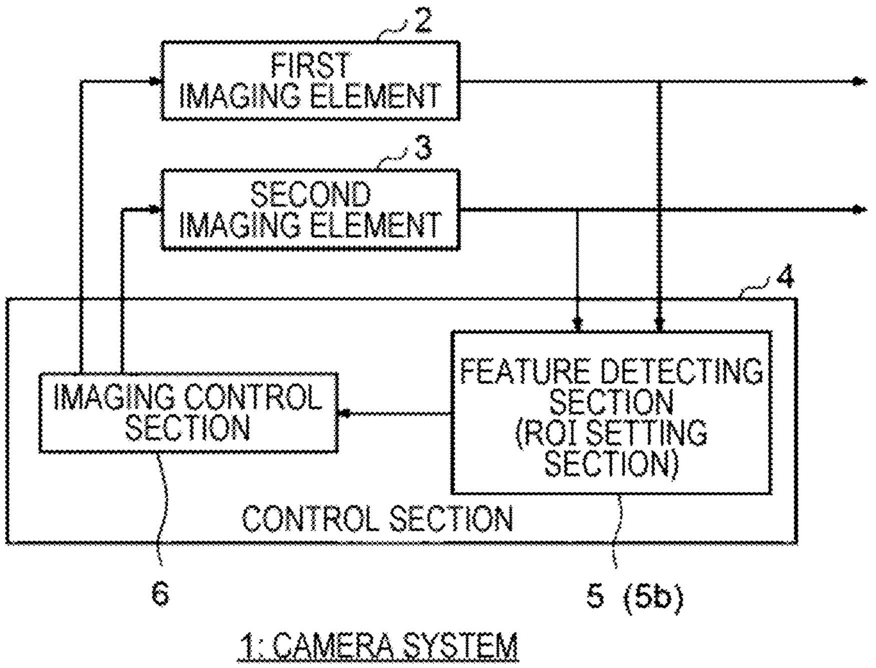
FIG. 10 is a block diagram illustrating a schematic configuration of a camera system according to a second embodiment.

FIG. 10 is a block diagram illustrating a schematic configuration of a camera system 1 according to a second embodiment. The camera system 1 of FIG. 10 is different from that of FIG. 1 in the internal configuration of the control section 4. The control section 4 in the camera system 1 of FIG. 10 includes an imaging control section 6 and a region of interest (ROI) setting section 5*b*. The ROI setting section 5*b* is one form of the feature detecting section 5.

The ROI setting section 5*b* sets a part of the pixel region of interest in the pixel array section 11. It is arbitrary which pixel position and how large the ROI pixel region is provided. The ROI setting section 5*b* in FIG. 10 sets the ROI pixel region on the basis of the image data at the time of preview reading. The ROI pixel region may be, for example, a pixel region including an eye, a face, an contour, or the like of a person.

The ROI setting section 5*b* sends the setting information of the ROI pixel region to the imaging control section 6. The imaging control section 6 transmits a control signal to the vertical scanning circuit 12 and the column signal processing circuit 14 on the basis of the setting information of the ROI pixel region.

Figure 11:
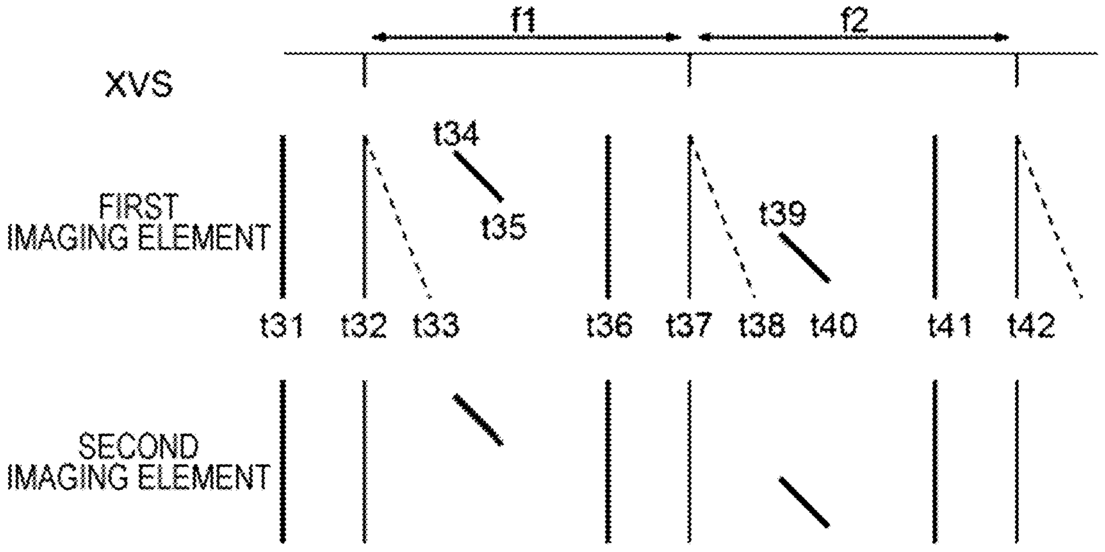
FIG. 11 is a schematic operation timing diagram of the camera system according to the second embodiment.

FIG. 11 is a schematic operation timing diagram of the camera system 1 according to the second embodiment. The first imaging element 2 and the second imaging element 3 start exposure at time t31 and end the exposure at time t32. The first imaging element 2 performs preview reading in a period from time t32 to time t33.

The ROI setting section 5*b* sets the ROI pixel region including the pixel of interest on the basis of the image data generated by the preview reading within the period from time t33 to time t34. The pixel of interest is, for example, a pixel 20 including an eye, a face, or the like of a person.

The ROI setting section 5*b* sends the setting information of the ROI pixel region to the imaging control section 6. The setting information of the ROI pixel region is, for example, information including the pixel position of the pixel of interest, the size and pixel position of the ROI pixel region set around the pixel of interest, and the like. The imaging control section 6 sends a control signal to the vertical scanning circuit 12 and the column signal processing circuit 14 on the basis of the setting information of the ROI pixel region. On the basis of the control signal, the vertical scanning circuit 12 drives a row scanning signal for driving a pixel row on which main reading is performed. On the basis of the control signal, the column signal processing circuit 14 acquires a pixel signal on the vertical signal line L2 corresponding to a pixel column on which main reading is performed, and performs AD conversion, CDS processing, and the like.

The first imaging element 2 and the second imaging element 3 perform main reading for outputting a pixel signal in the ROI pixel region within a period from time t34 to time t35. Since charges are already held in the first capacitor C1 and the second capacitor C2 in each pixel circuit 22, pixel signals based on the held charges of the first capacitor C1 and the second capacitor C2 can be quickly output.

During a period from time t32 to time t36, preview reading and main reading for the frame f1 are performed. Similarly, during a period from time t37 to time t40, preview reading and main reading for the next frame f2 are performed. The example of FIG. 11 illustrates an example in which the positions of the ROI pixel regions are different between the frame f1 and the frame f2. Since the ROI setting section 5*b* sets the ROI pixel region for each frame, the ROI pixel region is set at a different position for each frame in a case where the target object moves.

The operation timing diagram of FIG. 11 illustrates an example in which the pixel signal of the ROI pixel region is read out for each frame, but in some cases, the pixel of interest may not be present in the preview-read image data. For example, this is a case where the pixel of interest is a face of a person, but there is no person in the image data, or the like. In this case, the ROI setting section 5*b* cannot set the ROI pixel region. Therefore, depending on the frame, the first imaging element 2 and the second imaging element 3 may not perform main reading.

As described above, in the second embodiment, the ROI pixel region is set on the basis of the preview-read image data, and the pixel signal in the ROI pixel region is output from the first imaging element 2 and the second imaging element 3 within the frame period in which the preview is read. As a result, only the ROI pixel region can be output quickly and with low power consumption.

(Third Embodiment) In a third embodiment, an ROI pixel region is set in a pixel region where motion is detected.

Figure 12:
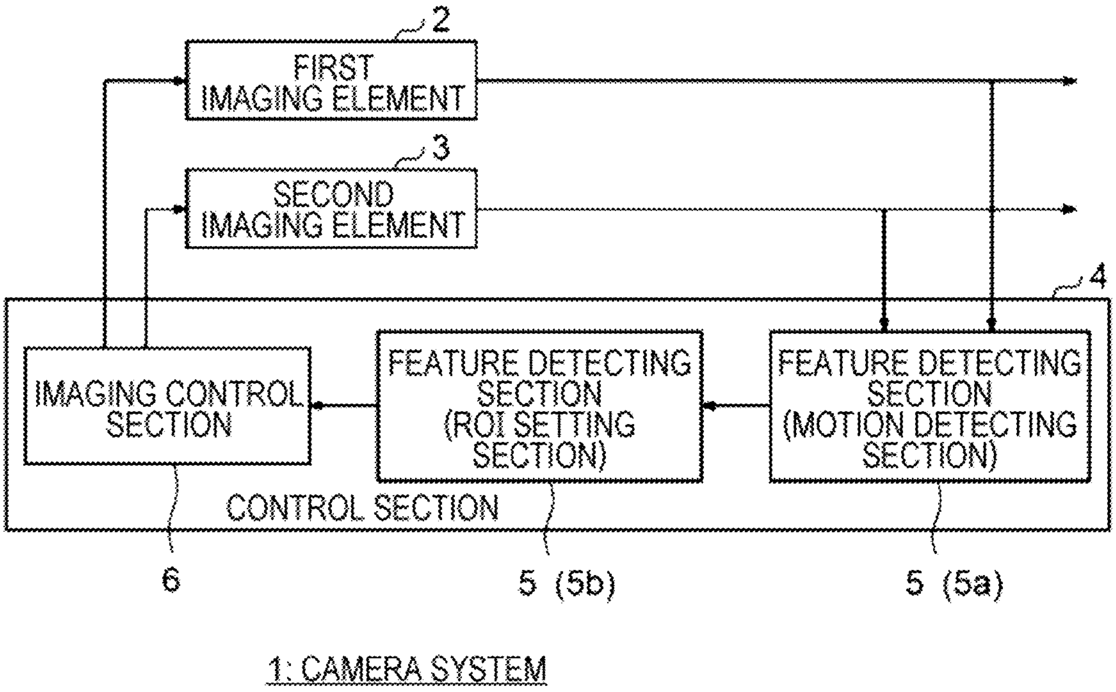
FIG. 12 is a block diagram illustrating a schematic configuration of a camera system according to a third embodiment.

FIG. 12 is a block diagram illustrating a schematic configuration of a camera system 1 according to the third embodiment. The camera system 1 of FIG. 12 is different from that of FIGS. 1 and 10 in the internal configuration of the control section 4. The control section 4 in the camera system 1 of FIG. 10 includes an imaging control section 6, a motion detecting section 5*a*, and an ROI setting section 5*b*. The motion detecting section 5*a* and the ROI setting section 5*b* are one form of the feature detecting section 5.

The motion detecting section 5*a* detects the motion on the basis of the image data generated by the preview reading of the first imaging element 2. The ROI setting section 5*b* sets the ROI pixel region so as to include the pixel 20 whose motion is detected by the motion detecting section 5*a*. The ROI setting section 5*b* sends the setting information of the ROI pixel region to the imaging control section 6. The imaging control section 6 sends a control signal to the vertical scanning circuit 12 and the column signal processing circuit 14 on the basis of the setting information of the ROI pixel region.

Figure 13:
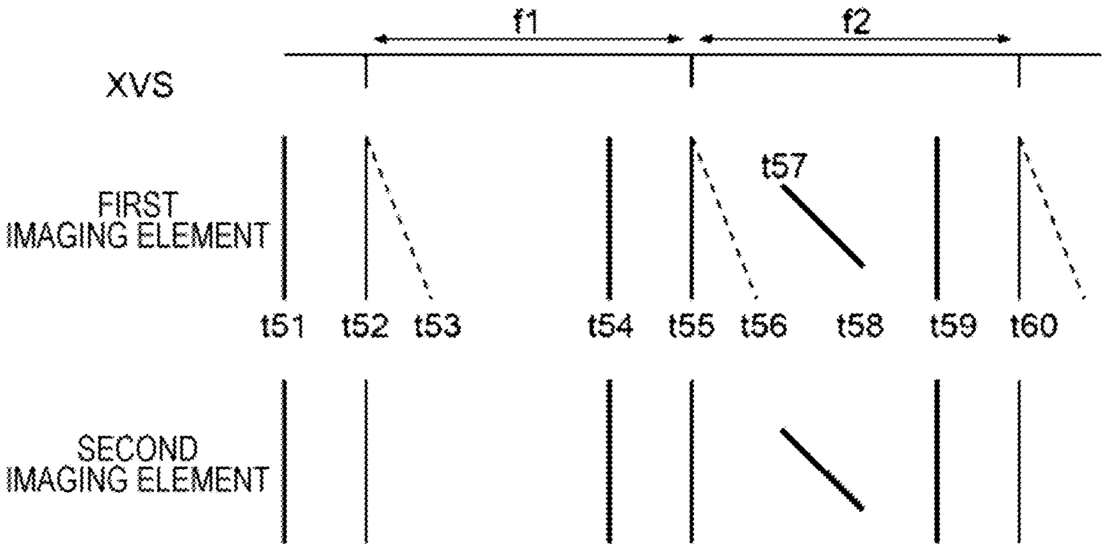
FIG. 13 is a schematic operation timing diagram of the camera system according to the third embodiment.

FIG. 13 is a schematic operation timing diagram of the camera system 1 according to the third embodiment. The first imaging element 2 and the second imaging element 3 start exposure at time t51, end exposure at time t52, hold the reset level charge in the first capacitor C1, and hold the signal charge in the second capacitor C2. The first imaging element 2 performs preview reading in a period from time t52 to time t53.

After time t53, the motion detecting section 5*a* detects the motion on the basis of the image data generated by the preview reading. The motion detecting section 5*a* transmits information of the pixel 20 in which the motion is detected to the ROI setting section 5*b*. The ROI setting section 5*b* sets an ROI pixel region including the pixel 20 in which the motion is detected. The ROI setting section 5*b* sends the setting information of the ROI pixel region to the imaging control section 6. The imaging control section 6 sends a control signal to the vertical scanning circuit 12 and the column signal processing circuit 14 on the basis of the setting information of the ROI pixel region.

FIG. 13 illustrates an example in which no motion is detected in the period of the frame f1 (times t52 to t55) and a motion is detected in the period of the next frame f2 (times t55 to t60).

When detecting the motion in the image data generated by the preview reading in the period from time t55 to time t56 in the period of the frame f2, the motion detecting section 5*a* sends information regarding the moving pixel 20 to the ROI setting section 5*b*. The ROI setting section 5*b* sets an ROI pixel region including the moving pixel 20.

The first imaging element 2 and the second imaging element 3 output pixel signals in the ROI pixel region during a period from time t57 to time t58.

As described above, in the third embodiment, the motion is detected on the basis of the image data generated in the preview reading, and the ROI pixel region including the moving pixel 20 is set. The first imaging element 2 and the second imaging element 3 output the pixel signal of the ROI pixel region within the frame period in which the preview reading has been performed. As a result, it is possible to quickly output the pixel signal of the ROI pixel region including the moving pixel 20 while suppressing the power consumption.

FIG. 12 illustrates an example in which the ROI pixel region including the pixel 20 in which the motion is detected by the motion detecting section 5*a* is set. However, as illustrated in FIG. 14, the ROI setting section 5*b* may set the ROI pixel region independently of the motion detecting section 5*a*.

Figure 14:
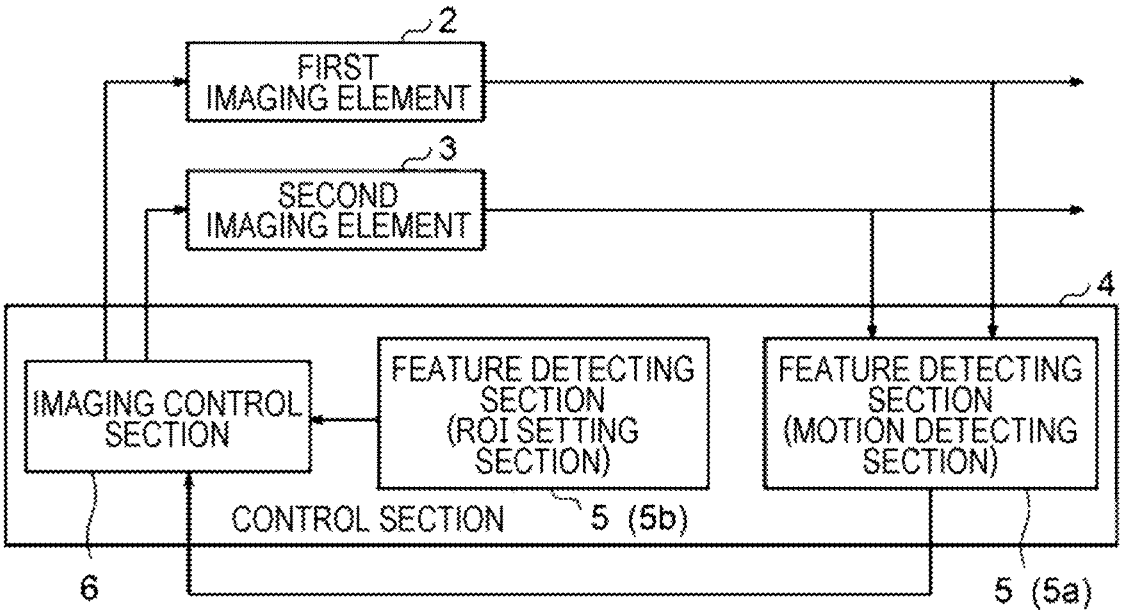
FIG. 14 is a block diagram illustrating a schematic configuration of a camera system according to a modification of the third embodiment.

FIG. 14 is a block diagram illustrating a schematic configuration of a camera system 1 according to a modification of the third embodiment. The control section 4 in the camera system 1 of FIG. 14 includes an imaging control section 6, a motion detecting section 5*a*, and an ROI setting section 5*b*, similarly to the control section 4 of FIG. 12.

The motion detecting section 5*a* detects the motion on the basis of the image data generated by the preview reading. Information indicating whether or not the motion is detected by the motion detecting section 5*a* is sent to the imaging control section 6. The ROI setting section 5*b* sets the ROI pixel region independently of the pixel 20 in which the motion is detected by the motion detecting section 5*a*. For example, the ROI setting section 5*b* sets the ROI pixel region around the pixel 20 including the face of the person or the like included in the image data generated by the preview reading. The setting information of the ROI pixel region by the ROI setting section 5*b* is transmitted to the imaging control section 6.

When the motion is detected on the basis of the image data generated by the preview reading, the first imaging element 2 and the second imaging element 3 output pixel signals in the ROI pixel region in the same frame period. As a result, the pixel signal in the ROI pixel region can be output only in a case where there is a motion.

(Fourth Embodiment) For one (for example, the first imaging element 2) of the first imaging element 2 and the second imaging element 3 for which preview reading is performed, charges of the first capacitor C1 and the second capacitor C2 are read out twice within the same frame period. Therefore, it is necessary to employ a pixel circuit 22 having a circuit configuration of a voltage domain scheme capable of reading out charges in a non-destructive manner. Meanwhile, the other (for example, the second imaging element 3) of the first imaging element 2 and the second imaging element 3 not performing preview reading does not necessarily need to adopt the pixel circuit 22 having the circuit configuration of the voltage domain scheme.

Figure 15:
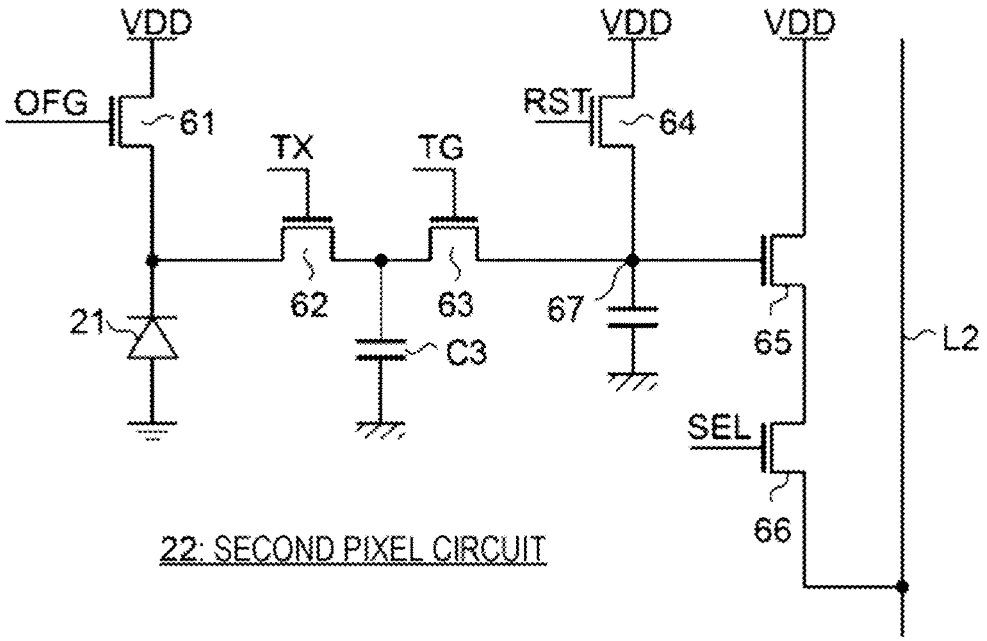
FIG. 15 is an alternative circuit diagram of a pixel circuit of a second imaging element on which preview reading is not performed.

FIG. 15 is an alternative circuit diagram of the pixel circuit (second pixel circuit) 22 of the second imaging element 3 on which preview reading is not performed. The pixel circuit 22 in FIG. 15 has a circuit configuration of a charge domain scheme. The pixel circuit 22 in FIG. 15 includes an overflow transistor 61, a first transfer transistor 62, a second transfer transistor 63, a reset transistor 64, an amplification transistor 65, a selection transistor 66, a capacitor C3, and a floating diffusion region 67.

The overflow transistor 61 is connected between the cathode of the photoelectric conversion element 21 and the power supply voltage node VDD. The overflow transistor 61 is turned on when the overflow signal is at a high level, and resets the accumulated charge in the photoelectric conversion element 21.

The first transfer transistor 62 and the second transfer transistor 63 are cascode-connected between the cathode of the photoelectric conversion element 21 and the floating diffusion region 67. The first transfer transistor 62 is turned on when the first transfer signal is at a high level. The second transfer transistor 63 is turned on when the second transfer signal is at a high level. The capacitor C3 is connected between a connection node and a ground node of the first transfer transistor 62 and the second transfer transistor 63.

The reset transistor 64 is connected between the power supply voltage node VDD and the floating diffusion region 67. The reset transistor 64 is turned on when the reset signal RST is at a high level, and resets the accumulated charge in the floating diffusion region 67. The amplification transistor 65 and the selection transistor 66 are cascode-connected between the power supply voltage node VDD and the vertical signal line L2. A voltage corresponding to the accumulated charge in the floating diffusion region 67 is applied to the gate of the amplification transistor 65. The selection transistor 66 is turned on when the selection signal is at a high level.

The capacitor C3 holds a reset level charge obtained by resetting the accumulated charge of the photoelectric conversion element 21 within a frame period, and then holds a charge (signal charge) corresponding to the incident light photoelectrically converted by the photoelectric conversion element 21.

As described above, since the pixel circuit 22 in FIG. 15 holds the reset level charge and the signal charge in the same capacitor C3 with time shifted, the kTC noise can be completely canceled when the CDS processing is performed in the column signal processing circuit 14. However, after the reset level charge held in the capacitor C3 is read, the accumulated charge in the capacitor C3 is reset once, and then the signal charge is held again. Therefore, this is destructive reading, and double reading cannot be performed in the same frame period.

Therefore, the pixel circuit 22 in FIG. 15 can be used only in the second imaging element 3 that does not perform preview reading. By configuring the pixel circuit 22 in the first imaging element 2 to have a circuit configuration of a voltage domain scheme and configuring the pixel circuit 22 in the second imaging element 3 to have a circuit configuration of a charge domain scheme, preview reading and main reading can be performed in the first imaging element 2, and main reading in which kTC noise is further suppressed can be performed in the second imaging element 3.

(Fifth Embodiment) In the first to fourth embodiments, in a case where a feature including a motion or a target object is detected on the basis of image data generated by preview reading, main reading of outputting pixel signals from the first imaging element 2 and the second imaging element 3 is performed.

In the first to fourth embodiments, the first imaging element 2 and the second imaging element 3 simultaneously start exposure, simultaneously end exposure, simultaneously hold the reset level charges in the first capacitors C1 of all the pixels, and then simultaneously hold the signal charges in the second capacitors C2 of all the pixels. In particular, when charges are held in the first capacitor C1 and the second capacitor C2, a large current temporarily flows in each pixel circuit 22, so that the peak power increases. Furthermore, the peak power also increases when a pixel signal corresponding to the held charges in the first capacitor C1 and the second capacitor C2 is output to the vertical signal line L2. Therefore, in a fifth embodiment, the peak power is suppressed.

Figure 16:
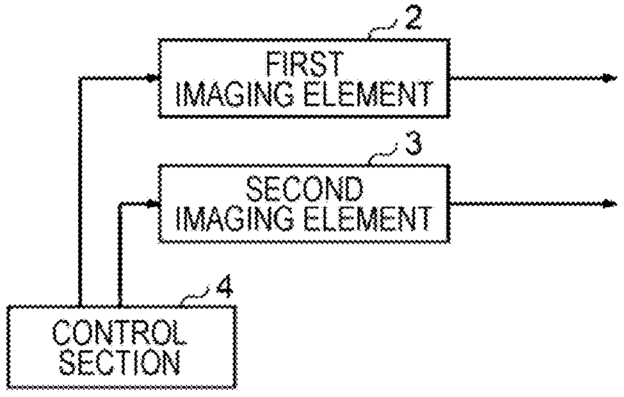
FIG. 16 is a block diagram illustrating a schematic configuration of a camera system according to a fifth embodiment.

FIG. 16 is a block diagram illustrating a schematic configuration of a camera system 1 according to the fifth embodiment. The camera system 1 in FIG. 16 includes a first imaging element 2, a second imaging element 3, and a control section 4. The control section 4 performs control to suppress peak power of the first imaging element 2 and the second imaging element 3. Each pixel 20 in the first imaging element 2 and the second imaging element 3 includes a pixel circuit 22 having a circuit configuration similar to that in FIG. 4.

Figure 17:
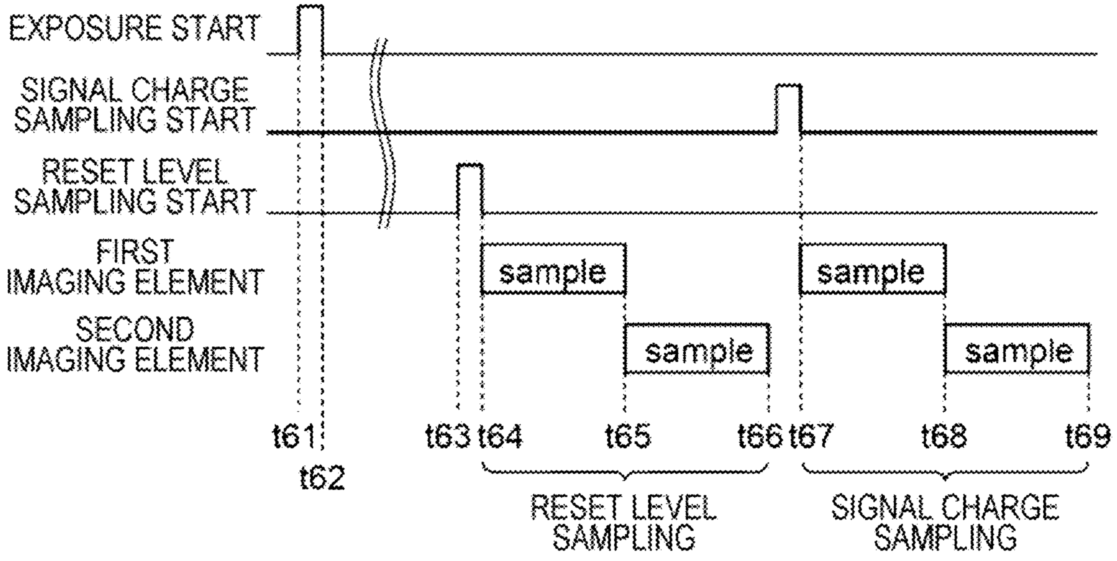
FIG. 17 is an operation timing diagram of the camera system according to the 15th embodiment.

FIG. 17 is an operation timing diagram of the camera system 1 according to the 15th embodiment. Time t61 is immediately before the exposure is started, and both the first reset transistor 33 and the transfer transistor 31 are turned on. As a result, the accumulated charge in the photoelectric conversion element 21 is reset. When the first reset transistor 33 and the transfer transistor 31 are turned off at time t62, exposure is started.

When the first selection transistor 41 in each of the pixel circuits 22 of the first imaging element 2 and the second imaging element 3 is turned on at time t63, the reset level charge is held in the first capacitor C1 in each of the pixel circuits 22 of the first imaging element 2 during a period from time t64 to time t65. Thereafter, during a period from time t65 to time t66, the reset level charge is held in the first capacitor C1 in each pixel circuit 22 of the second imaging element 3.

When the second selection transistor 42 in each of the pixel circuits 22 of the first imaging element 2 and the second imaging element 3 is turned on at time t66, signal charges are held in the second capacitor C2 in each of the pixel circuits 22 of the first imaging element 2 in a period from time t67 to time t68. Thereafter, during a period from time t68 to time t69, the signal charge is held in the second capacitor C2 in each pixel circuit 22 of the second imaging element 3.

After time t69, the first imaging element 2 and the second imaging element 3 sequentially transmit pixel signals corresponding to the charges held in the first capacitor C1 and the second capacitor C2 in each pixel circuit 22 to the vertical signal line L2.

As described above, as illustrated in the operation timing diagram of FIG. 17, the first imaging element 2 and the second imaging element 3 shift timings at which the reset level charge is held in the first capacitor C1 from each other. Furthermore, the first imaging element 2 and the second imaging element 3 have timings at which signal charges are held in the second capacitor C2 shifted from each other. As a result, peak power of the first imaging element 2 and the second imaging element 3 can be suppressed when charges are held in the first capacitor C1 and the second capacitor C2.

Figure 18:
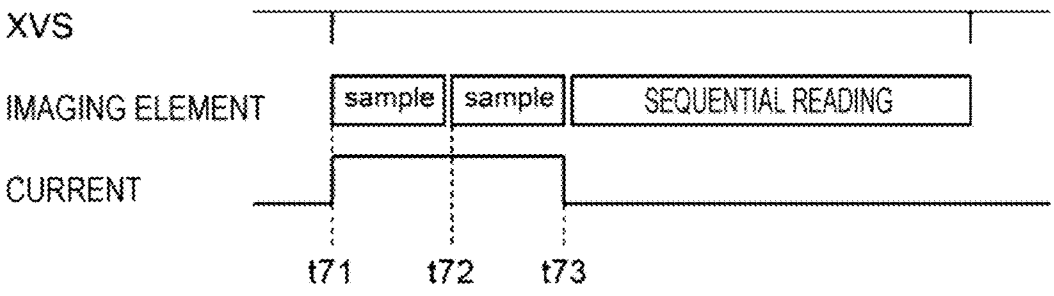
FIG. 18 is an operation timing diagram of a camera system according to a comparative example.

FIG. 18 is an operation timing diagram of the camera system 1 according to a comparative example. In the camera system 1 of FIG. 18, the first imaging element 2 and the second imaging element 3 simultaneously hold the reset level charge in the first capacitor C1 (time t71 to t72), and then hold the signal charge in the second capacitor C2 (time t72 to t73).

In the case of FIG. 18, since the reset level charges are simultaneously held in the first capacitors C1 of all the pixels of the first imaging element 2 and the second imaging element 3, and thereafter, the signal charges are simultaneously held in the second capacitors C2 of all the pixels, the peak power in the period from time t71 to time t72 and the period from time t72 to time t73 increases.

On the other hand, in the camera system 1 according to the fifth embodiment, as illustrated in FIG. 17, since the first imaging element 2 and the second imaging element 3 hold the charges of the first capacitor C1 and the second capacitor C2 for all the pixels with time shifted, the peak power can be suppressed to about half of that of one comparative example.

Figure 19:
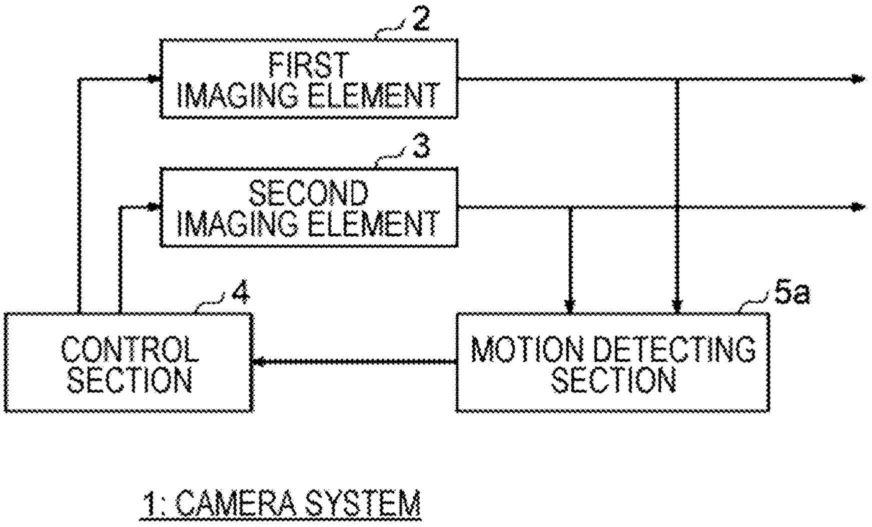
FIG. 19 is a block diagram illustrating a schematic configuration of a camera system according to a modification of FIG. 16.

The camera system 1 of FIG. 16 can be combined with the camera system 1 according to the first to fourth embodiments described above. FIG. 19 is a block diagram illustrating a schematic configuration of a camera system 1 according to a modification of FIG. 16. The camera system 1 of FIG. 19 is obtained by adding a motion detecting section 5*a* to the block configuration of FIG. 16. In FIG. 19, the motion detecting section 5*a* is provided separately from the control section 4, but the motion detecting section 5*a* may be provided inside the control section 4 similarly to FIG. 1.

The first imaging element 2 and the second imaging element 3 simultaneously start exposure and simultaneously end exposure. The first imaging element 2 and the second imaging element 3 hold a reset level charge in the first capacitor C1 in each pixel circuit 22 with time shifted from each other, and then hold a signal charge in the second capacitor C2 in each pixel circuit 22 with time shifted from each other.

One of the first imaging element 2 and the second imaging element 3 (for example, the first imaging element 2) performs preview reading. The motion detecting section 5*a* detects a motion on the basis of image data generated by preview reading, and sends the detection result to the control section 4. The control section 4 instructs the first imaging element 2 and the second imaging element 3 to perform main reading only in a case where motion is detected by the motion detecting section 5*a*. The first imaging element 2 and the second imaging element 3 output pixel signals corresponding to the charges held in the first capacitor C1 and the second capacitor C2 to the vertical signal line L2 only in a case where the motion is detected by the motion detecting section 5*a*.

As described above, in the fifth embodiment, the timing at which the first capacitor C1 in each pixel circuit 22 holds the charge according to the reset level is shifted between the first imaging element 2 and the second imaging element 3, and the timing at which the second capacitor C2 in each pixel circuit 22 holds the signal charge is shifted between the first imaging element 2 and the second imaging element 3. As a result, the peak power can be suppressed.

(Sixth Embodiment) In the fifth embodiment, the measure for suppressing the peak power at the time of holding (sampling) the charges in the first capacitor C1 and the second capacitor C2 has been described. However, the peak power can also be generated when the pixel signal corresponding to the held charges in the first capacitor C1 and the second capacitor C2 is output to the vertical signal line L2. In a sixth embodiment, peak power when a pixel signal is output to the vertical signal line L2 is suppressed.

A camera system 1 according to the sixth embodiment has a block configuration similar to that in FIG. 16 or 19.

Figure 20:
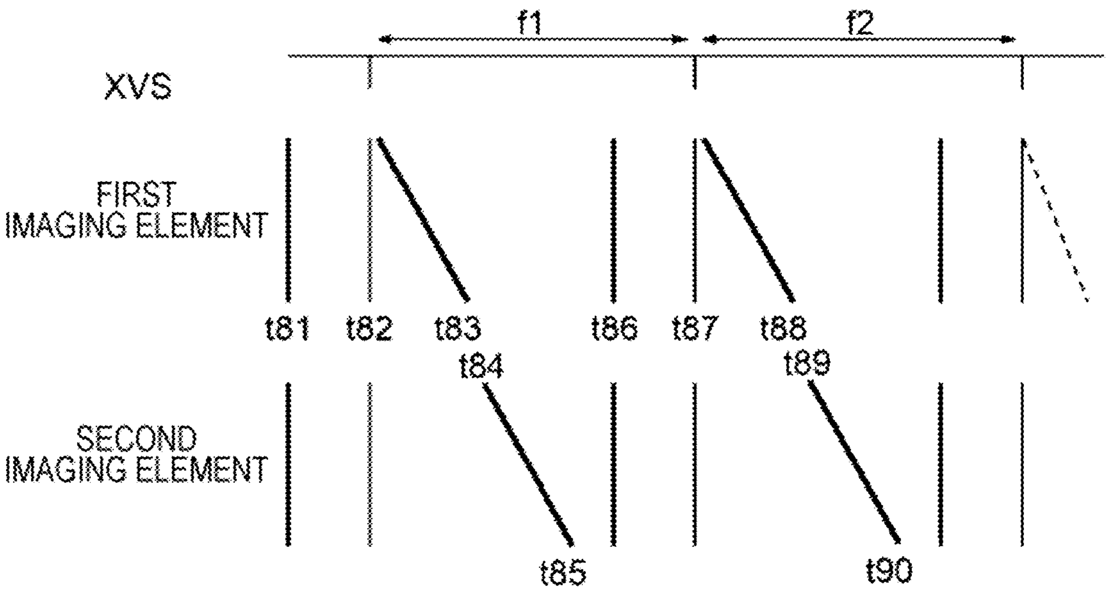
FIG. 20 is an operation timing diagram of a camera system according to a sixth embodiment.

FIG. 20 is an operation timing diagram of the camera system 1 according to the sixth embodiment. The operation timing diagram of FIG. 20 illustrates the timings of the signal charge sampling and the read operation, and the timings of the reset level charge sampling and the read operation are omitted.

The first imaging element 2 and the second imaging element 3 start exposure at time t81, end exposure at time t82, and hold (sample) signal charges in the second capacitors C2 for all the pixels.

The first imaging element 2 outputs a pixel signal corresponding to the held charge in the second capacitor C2 of each pixel 20 for each pixel row in the period from time t82 to time t83. Thereafter, the second imaging element 3 outputs a pixel signal corresponding to the held charge in the second capacitor C2 of each pixel 20 for each pixel row in the period from time t84 to time t85. The above operation is repeated for each frame period.

As illustrated in FIG. 20, since the pixel signals corresponding to the held charges of the second capacitors C2 for all the pixels are output by the first imaging element 2 and the second imaging element 3 with time shifted, it is possible to suppress peak power when the pixel signals are output from the second capacitors C2 to the vertical signal line L2.

In FIG. 20, since the second imaging element 3 outputs a pixel signal for one frame after the first imaging element 2 finishes outputting a pixel signal for one frame, when pattern matching between image data captured by the first imaging element 2 and image data captured by the second imaging element 3 is performed by a signal processing circuit (not illustrated), image data captured by the first imaging element 2 needs to be temporarily stored in a frame memory or the like. If the image data captured by the first inspection image element and the image data captured by the second imaging element 3 are input to the signal processing circuit at the same timing, it is not necessary to store the image data in the frame memory. Therefore, as described below, it is also possible to perform timing control in which the first imaging element 2 and the second imaging element 3 output pixel signals substantially simultaneously.

Figure 21:
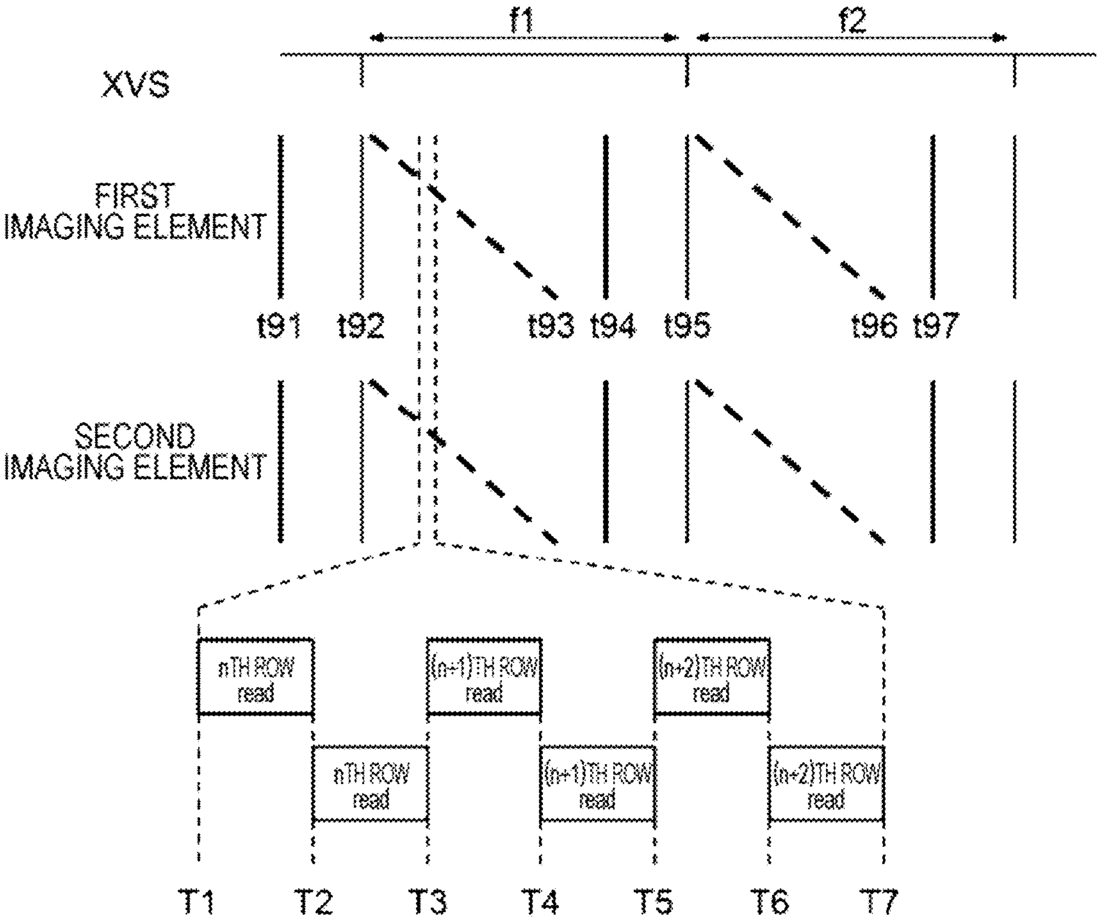
FIG. 21 is an operation timing diagram according to a modification of the sixth embodiment.

FIG. 21 is an operation timing diagram according to a modification of the sixth embodiment. FIG. 21 illustrates timing at which the signal charge is held in the second capacitor C2 and the pixel signal corresponding to the held charge of the second capacitor C2 is output to the vertical signal line L2, and timing at which the reset level charge is held in the first capacitor C1 and the pixel signal corresponding to the held charge of the first capacitor C1 is output to the vertical signal line L2 is omitted.

The first imaging element 2 and the second imaging element 3 start exposure at time t91 and end exposure at time t92, and the second capacitor C2 holds (samples) signal charges. Thereafter, during a period from time t92 to time t93, the first imaging element 2 and the second imaging element 3 alternately output pixel signals corresponding to the held charges of the corresponding second capacitors C2 to the vertical signal line L2 for each pixel row.

FIG. 21 illustrates output timings (times T1 to T3) of the nth pixel rows, output timings (times T3 to T5) of the (n+1)th pixel rows, and output timings (times T5 to T7) of the (n+2)th pixel rows.

In the case of FIG. 21, since the first imaging element 2 and the second imaging element 3 alternately output pixel signals for each pixel row, the timing at which the column signal processing circuit 14 generates the pixel 20 data for one frame is substantially the same between the first imaging element 2 and the second imaging element 3, and two types of image data can be generated substantially simultaneously, and pattern matching and the like can be quickly performed without storing the image data in the frame memory.

In FIG. 21, since the first imaging element 2 and the second imaging element 3 alternately output pixel signals for each pixel row, the peak power can be suppressed to about half as compared with a case where the first imaging element 2 and the second imaging element 3 simultaneously output pixel signals.

As described above, in the sixth embodiment, when the pixel signal corresponding to the signal charge held in the second capacitor C2 is output to the vertical signal line L2, the output timing is shifted between the first imaging element 2 and the second imaging element 3, so that the peak power can be suppressed.

<Application Example> The technology according to the present disclosure can be applied to various products. For example, the technology according to the present disclosure may also be implemented as a device mounted on any kind of mobile body such as an automobile, an electric automobile, a hybrid electric automobile, a motorcycle, a bicycle, a personal mobility, an airplane, a drone, a ship, a robot, a construction machine, an agricultural machine (tractor), or the like.

Figure 22:
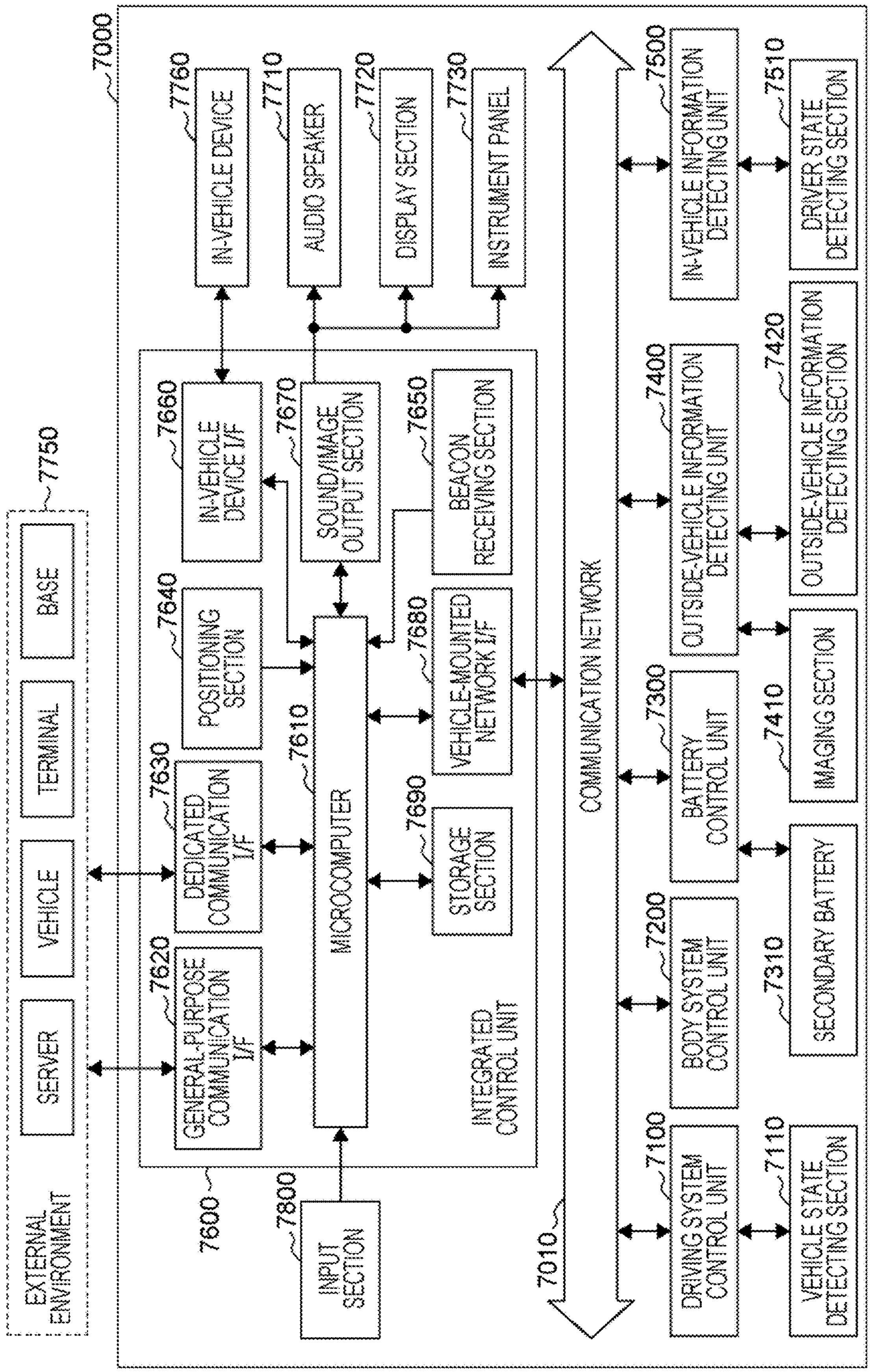
FIG. 22 is a block diagram depicting an example of schematic configuration of a vehicle control system.

FIG. 22 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 22, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 22 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 23:
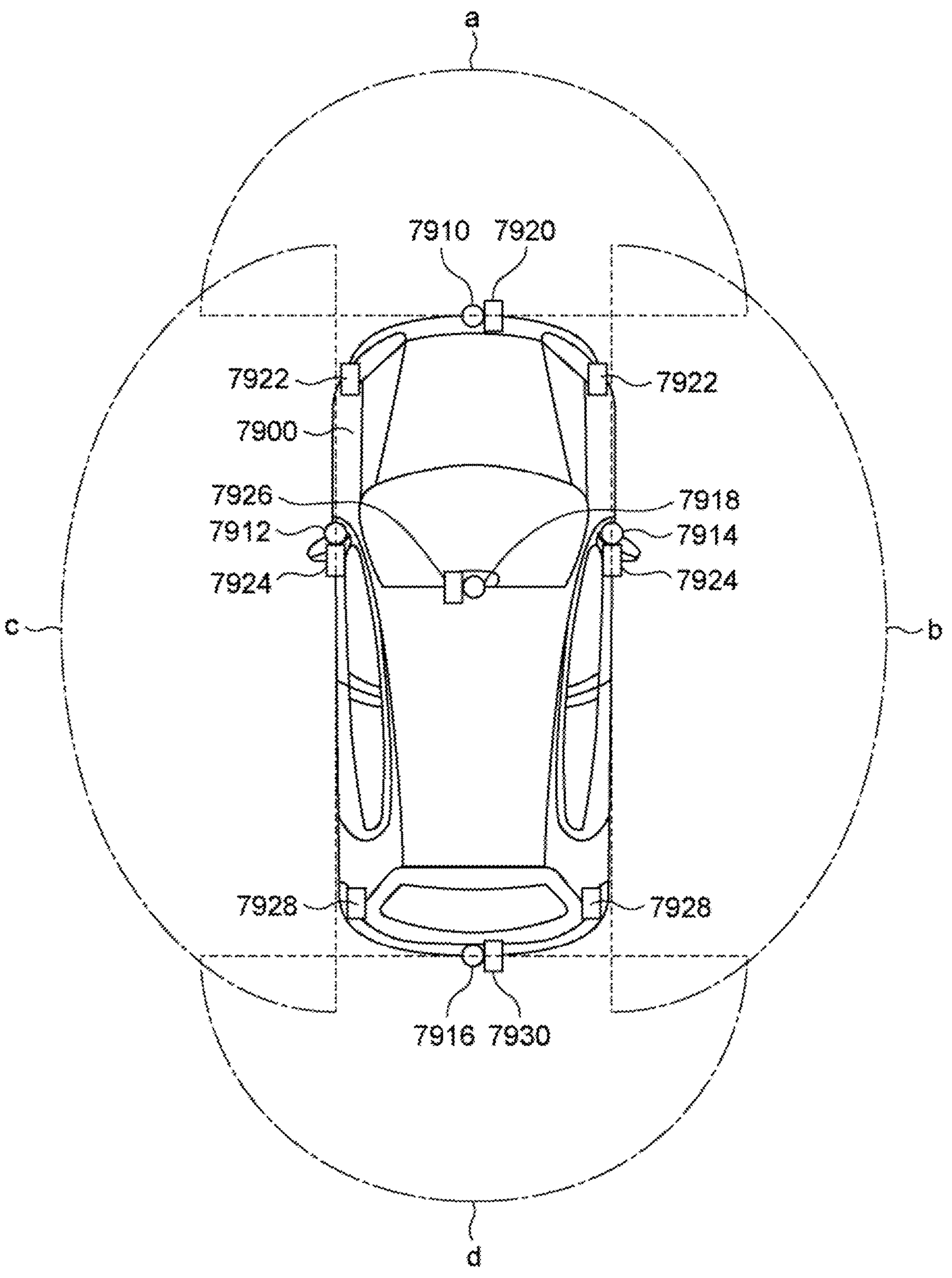
FIG. 23 is a diagram of assistance in explaining an example of installation positions of an outside-vehicle information detecting section and an imaging section.

FIG. 23 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 22, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 22, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 22 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for implementing each function of the camera system 1 according to the present embodiments described with reference to FIGS. 1 to 21 can be mounted on any control unit or the like. Furthermore, a computer-readable recording medium in which such a computer program is stored can be provided. The recording medium is, for example, a magnetic disk, an optical disk, a magneto-optical disk, a flash memory, or the like. Furthermore, the computer program described above may be distributed via, for example, a network without using a recording medium.

In the vehicle control system 7000 described above, the camera system according to the present embodiments described with reference to FIGS. 1 to 21 can be applied to the integrated control unit 7600 of the application example illustrated in FIG. 22.

Furthermore, at least some components of the camera system 1 described with reference to FIGS. 1 to 21 may be implemented in a module (for example, an integrated circuit module including one die) for the integrated control unit 7600 illustrated in FIG. 22. Alternatively, the camera system 1 described with reference to FIGS. 1 to 21 may be implemented by a plurality of control units of the vehicle control system 7000 illustrated in FIG. 22.

Note that the present technology may have the following configurations.

(1) A camera system including: a first imaging element; a second imaging element; and a control section that controls the first imaging element and the second imaging element, in which the first imaging element includes a plurality of first pixel circuits that simultaneously samples charges according to incident light photoelectrically converted in each pixel and reads out the charges sampled in a non-destructive manner, the second imaging element includes a plurality of second pixel circuits that simultaneously samples charges according to incident light photoelectrically converted in each pixel and reads out the charges sampled in a non-destructive manner, the first imaging element switches whether or not to output a pixel signal from at least some first pixel circuits among the plurality of first pixel circuits within a same frame period on the basis of a pixel signal output from some of the first pixel circuits or some of the second pixel circuits for each frame period, and the second imaging element switches whether or not to output a pixel signal from at least some second pixel circuits among the plurality of second pixel circuits within a same frame period on the basis of a pixel signal output from the some first pixel circuits or the some second pixel circuits for each frame period.

(2) The camera system according to (1), in which the some first pixel circuits or the some second pixel circuits are arranged at one or more pixel positions obtained by thinning out the plurality of first pixel circuits or the plurality of second pixel circuits in at least one of a first direction or a second direction.

(3) The camera system according to (1) or (2), in which the control section includes a feature detecting section that detects a feature including at least one of motion of a target object or presence of the target object on the basis of a pixel signal output from the some first pixel circuits or the some second pixel circuits for each frame period, the first imaging element outputs a pixel signal from at least some first pixel circuits among the plurality of first pixel circuits within the frame period in which the feature is detected by the feature detecting section, and the second imaging element outputs a pixel signal from at least some first pixel circuits among the plurality of first pixel circuits within the frame period in which the feature is detected by the feature detecting section.

(4) The camera system according to (3), in which the first imaging element outputs a pixel signal from the plurality of first pixel circuits within the frame period in which the feature is detected by the feature detecting section, and the second imaging element outputs a pixel signal from the plurality of second pixel circuits within the frame period in which the feature is detected by the feature detecting section.

(5) The camera system according to (4), in which the feature detecting section detects the feature on the basis of a pixel signal output from the some first pixel circuits, and the first imaging element outputs a pixel signal twice from the some first pixel circuits and outputs a pixel signal once from each of the first pixel circuits other than the some first pixel circuits within the frame period in which the feature is detected by the feature detecting section.

(6) The camera system according to any one of (4) to (5), in which the first imaging element stops outputting a pixel signal from the plurality of first pixel circuits during a frame period in which no feature is detected by the feature detecting section, and the second imaging element stops outputting a pixel signal from the plurality of second pixel circuits during the frame period in which no feature is detected by the feature detecting section.

(7) The camera system according to any one of (3) to (6), in which the control section includes an ROI setting section that sets a first region of interest (ROI) pixel region including one or more first pixel circuits in the plurality of first pixel circuits and sets a second ROI pixel region including one or more second pixel circuits in the plurality of second pixel circuits for each frame period in accordance with a pixel position including the feature detected by the feature detecting section, the first imaging element outputs a pixel signal in the first ROI pixel region within the same frame period, and the second imaging element outputs a pixel signal in the second ROI pixel region within the same frame period.

(8) The camera system according to any one of (3) to (7), in which the feature detecting section detects the motion on the basis of a pixel signal output from the some first pixel circuits or the some second pixel circuits for each frame period, the first imaging element outputs a pixel signal from at least some first pixel circuits among the plurality of first pixel circuits within a frame period in which the motion is detected, and the second imaging element outputs a pixel signal from at least some second pixel circuits among the plurality of second pixel circuits within the frame period in which the motion is detected.

(9) The camera system according to any one of (3) to (7), in which the feature detecting section detects the motion on the basis of a pixel signal output from the some first pixel circuits or the some second pixel circuits for each frame period, the control section includes an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits, the first imaging element outputs a pixel signal in the first ROI pixel region within a frame period in which the motion is detected, and the second imaging element outputs a pixel signal in the second ROI pixel region within the frame period in which the motion is detected.

(10) The camera system according to (1) or (2), in which the control section includes:

a target object determination section that determines whether or not a target object is imaged on the basis of a pixel signal output from the some first pixel circuits or the some second pixel circuits for each frame period; and an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits in a case where it is determined that the target object is imaged, the first imaging element outputs a pixel signal from the first pixel circuit in the first ROI pixel region within a frame period in which the target object is imaged, and the second imaging element outputs a pixel signal from the second pixel circuit in the second ROI pixel region within the frame period in which the target object is imaged.

(11) The camera system according to (10), in which the control section controls pixel positions of the first ROI pixel region and the second ROI pixel region for each frame period to include the target object in accordance with a position of the target object.

(12) The camera system according to any one of (1) to (11), in which each of the plurality of first pixel circuits includes:

a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits includes:

a second floating diffusion region that accumulates a charge corresponding to incident light photoelectrically converted by a second photoelectric conversion element;

a third capacitor that accumulates a charge according to a potential of the second floating diffusion region in a state where the charge of the second floating diffusion region is reset; and a fourth capacitor that accumulates a charge corresponding to incident light photoelectrically converted by the second photoelectric conversion element, and charges accumulated in the first capacitor, the second capacitor, the third capacitor, and the fourth capacitor are held in a same frame period even after being read.

(13) The camera system according to any one of (1) to (11), in which the first imaging element switches whether or not to output a pixel signal from at least some first pixel circuits among the plurality of first pixel circuits within a same frame period on the basis of a pixel signal output from some of the first pixel circuits for each frame period, the second imaging element switches whether or not to output a pixel signal from at least some second pixel circuits among the plurality of second pixel circuits within a same frame period on the basis of a pixel signal output from some of the first pixel circuits for each frame period, each of the plurality of first pixel circuits includes:

a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits includes:

a second floating diffusion region that accumulates a charge corresponding to incident light photoelectrically converted by a second photoelectric conversion element; and a third capacitor that accumulates a charge in a state where the second floating diffusion region is reset or a charge according to incident light photoelectrically converted by the second photoelectric conversion element, charges accumulated in the first capacitor and the second capacitor are held in a same frame even after being read, and the third capacitor accumulates a charge in a state where the second floating diffusion region is reset within one frame period, and then accumulates a charge according to incident light photoelectrically converted by the second photoelectric conversion element.

(14) The camera system according to any one of (1) to (13), in which the control section shifts a timing at which the first imaging element samples a charge according to incident light photoelectrically converted by first photoelectric conversion elements in at least some first pixel circuits among the plurality of first pixel circuits within the same frame period from a timing at which the second imaging element samples a charge according to incident light photoelectrically converted by second photoelectric conversion elements in at least some second pixel circuits among the plurality of second pixel circuits within the same frame period from each other.

(15) The camera system according to (14), in which the control section shifts a timing at which the first imaging element samples a reset level charge in at least some first pixel circuits among the plurality of first pixel circuits within the same frame period, a timing at which the first imaging element samples a charge according to incident light photoelectrically converted by the first photoelectric conversion element, a timing at which the second imaging element samples a reset level charge in at least some second pixel circuits among the plurality of second pixel circuits within the same frame period, and a timing at which the second imaging element samples a charge according to incident light photoelectrically converted by the second photoelectric conversion element from each other.

(16) The camera system according to any one of (1) to (15), in which the control section shifts a timing at which the first imaging element outputs a pixel signal from at least some first pixel circuits among the plurality of first pixel circuits within the same frame period and a timing at which the second imaging element outputs a pixel signal from at least some second pixel circuits among the plurality of second pixel circuits within the same frame period from each other.

(17) The camera system according to (16), in which the control section causes at least some first pixel circuits among the plurality of first pixel circuits to output a pixel signal within the same frame period, and then causes at least some second pixel circuits among the plurality of second pixel circuits to output a pixel signal within the same frame period.

(18) The camera system according to any one of (1) to (15), in which the plurality of first pixel circuits is arranged in each of a first direction and a second direction, the plurality of second pixel circuits is arranged in each of the first direction and the second direction, and when outputting a pixel signal within the same frame period, the first imaging element and the second imaging element alternately output a pixel signal for each pixel group arranged in the second direction.

(19) The camera system according to any one of (1) to (18), in which the first imaging element and the second imaging element have a same number of pixels, and the first imaging element and the second imaging element perform exposure at a same exposure timing.

(20) A control method for a camera system including: a first imaging element including a plurality of first pixel circuits that simultaneously samples charges according to incident light photoelectrically converted in each pixel and reads out the charges sampled in a non-destructive manner;

a second imaging element including a plurality of second pixel circuits that simultaneously samples charges according to incident light photoelectrically converted in each pixel and reads out the charges sampled in a non-destructive manner; and a control section that controls the first imaging element and the second imaging element, in which the first imaging element switches whether or not to output a pixel signal from at least some first pixel circuits among the plurality of first pixel circuits within a same frame period on the basis of a pixel signal output from some of the first pixel circuits or some of the second pixel circuits for each frame period, and the second imaging element switches whether or not to output a pixel signal from at least some second pixel circuits among the plurality of second pixel circuits within a same frame period on the basis of a pixel signal output from the some first pixel circuits or the some second pixel circuits for each frame period.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Camera system
2 First imaging element
3 Second imaging element
4 Control section
5 Feature detecting section
5*a* Detecting section
5*b* ROI setting section
6 Imaging control section
7 Storage section
8 Comparison section
11 Pixel array section
12 Vertical scanning circuit
13 Load MOS circuit
14 Column signal processing circuit
15 Timing control circuit
16 Digital-to-analog converter (DAC)
20 Pixel
21 Photoelectric conversion element
22 Pixel circuit
23 Pre-stage circuit
24 Selection circuit
25 Post-stage circuit
31 Transfer transistor
32 Floating diffusion region
33 First reset transistor
34 First amplification transistor
35 Current source
41 First selection transistor
42 Second selection transistor
43 Second amplification transistor
44 Third selection transistor
45 Second reset transistor
51 Current source
52 Analog-to-digital converter
53 Digital signal processing section
61 Overflow transistor
62 First transfer transistor
63 Second transfer transistor
64 Reset transistor
65 Amplification transistor
66 Selection transistor
67 Floating diffusion region

The invention claimed is:

1. A camera system comprising: a first imaging element; a second imaging element; and a control section that controls the first imaging element and the second imaging element, wherein the first imaging element includes a plurality of first pixel circuits that simultaneously samples charges according to incident light photoelectrically converted in each pixel and reads out the charges sampled in a non-destructive manner, the second imaging element includes a plurality of second pixel circuits that simultaneously samples charges according to incident light photoelectrically converted in each pixel and reads out the charges sampled in a non-destructive manner, the first imaging element switches whether or not to output a pixel signal from at least some first pixel circuits among the plurality of first pixel circuits within a same frame period on a basis of a pixel signal output from some of the first pixel circuits or some of the second pixel circuits for each frame period, and the second imaging element switches whether or not to output a pixel signal from at least some second pixel circuits among the plurality of second pixel circuits within a same frame period on a basis of a pixel signal output from the some first pixel circuits or the some second pixel circuits for each frame period.

2. The camera system according to claim 1, wherein the some first pixel circuits or the some second pixel circuits are arranged at one or more pixel positions obtained by thinning out the plurality of first pixel circuits or the plurality of second pixel circuits in at least one of a first direction or a second direction.

3. The camera system according to claim 1, wherein the control section includes a feature detecting section that detects a feature including at least one of motion of a target object or presence of the target object on a basis of a pixel signal output from the some first pixel circuits or the some second pixel circuits for each frame period, the first imaging element outputs a pixel signal from at least some first pixel circuits among the plurality of first pixel circuits within the frame period in which the feature is detected by the feature detecting section, and the second imaging element outputs a pixel signal from at least some first pixel circuits among the plurality of first pixel circuits within the frame period in which the feature is detected by the feature detecting section.

4. The camera system according to claim 3, wherein the first imaging element outputs a pixel signal from the plurality of first pixel circuits within the frame period in which the feature is detected by the feature detecting section, and the second imaging element outputs a pixel signal from the plurality of second pixel circuits within the frame period in which the feature is detected by the feature detecting section.

5. The camera system according to claim 4, wherein the feature detecting section detects the feature on a basis of a pixel signal output from the some first pixel circuits, and the first imaging element outputs a pixel signal twice from the some first pixel circuits and outputs a pixel signal once from each of the first pixel circuits other than the some first pixel circuits within the frame period in which the feature is detected by the feature detecting section.

6. The camera system according to claim 4, wherein the first imaging element stops outputting a pixel signal from the plurality of first pixel circuits during a frame period in which no feature is detected by the feature detecting section, and the second imaging element stops outputting a pixel signal from the plurality of second pixel circuits during the frame period in which no feature is detected by the feature detecting section.

7. The camera system according to claim 3, wherein the control section includes an ROI setting section that sets a first region of interest (ROI) pixel region including one or more first pixel circuits in the plurality of first pixel circuits and sets a second ROI pixel region including one or more second pixel circuits in the plurality of second pixel circuits for each frame period in accordance with a pixel position including the feature detected by the feature detecting section, the first imaging element outputs a pixel signal in the first ROI pixel region within the same frame period, and the second imaging element outputs a pixel signal in the second ROI pixel region within the same frame period.

8. The camera system according to claim 3, wherein the feature detecting section detects the motion on a basis of a pixel signal output from the some first pixel circuits or the some second pixel circuits for each frame period, the first imaging element outputs a pixel signal from at least some first pixel circuits among the plurality of first pixel circuits within a frame period in which the motion is detected, and the second imaging element outputs a pixel signal from at least some second pixel circuits among the plurality of second pixel circuits within the frame period in which the motion is detected.

9. The camera system according to claim 3, wherein the feature detecting section detects the motion on a basis of a pixel signal output from the some first pixel circuits or the some second pixel circuits for each frame period, the control section includes an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits, the first imaging element outputs a pixel signal in the first ROI pixel region within a frame period in which the motion is detected, and the second imaging element outputs a pixel signal in the second ROI pixel region within the frame period in which the motion is detected.

10. The camera system according to claim 1, wherein the control section includes:

a target object determination section that determines whether or not a target object is imaged on a basis of a pixel signal output from the some first pixel circuits or the some second pixel circuits for each frame period; and an ROI setting section that sets a first ROI pixel region including pixel positions of one or more of the first pixel circuits among the plurality of first pixel circuits and sets a second ROI pixel region including pixel positions of one or more of the second pixel circuits among the plurality of second pixel circuits in a case where it is determined that the target object is imaged, the first imaging element outputs a pixel signal from the first pixel circuit in the first ROI pixel region within a frame period in which the target object is imaged, and the second imaging element outputs a pixel signal from the second pixel circuit in the second ROI pixel region within the frame period in which the target object is imaged.

11. The camera system according to claim 10, wherein the control section controls pixel positions of the first ROI pixel region and the second ROI pixel region for each frame period to include the target object in accordance with a position of the target object.

12. The camera system according to claim 1, wherein each of the plurality of first pixel circuits includes:

a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits includes:

a second floating diffusion region that accumulates a charge corresponding to incident light photoelectrically converted by a second photoelectric conversion element;

a third capacitor that accumulates a charge according to a potential of the second floating diffusion region in a state where the charge of the second floating diffusion region is reset; and a fourth capacitor that accumulates a charge corresponding to incident light photoelectrically converted by the second photoelectric conversion element, and charges accumulated in the first capacitor, the second capacitor, the third capacitor, and the fourth capacitor are held in a same frame period even after being read.

13. The camera system according to claim 1, wherein the first imaging element switches whether or not to output a pixel signal from at least some first pixel circuits among the plurality of first pixel circuits within a same frame period on a basis of a pixel signal output from some of the first pixel circuits for each frame period, the second imaging element switches whether or not to output a pixel signal from at least some second pixel circuits among the plurality of second pixel circuits within a same frame period on a basis of a pixel signal output from some of the first pixel circuits for each frame period, each of the plurality of first pixel circuits includes:

a first floating diffusion region that accumulates a charge corresponding to incident light photoelectrically converted by a first photoelectric conversion element;

a first capacitor that accumulates a charge according to a potential of the first floating diffusion region in a state where the charge of the first floating diffusion region is reset; and a second capacitor that accumulates a charge corresponding to incident light photoelectrically converted by the first photoelectric conversion element, each of the plurality of second pixel circuits includes:

a second floating diffusion region that accumulates a charge corresponding to incident light photoelectrically converted by a second photoelectric conversion element; and a third capacitor that accumulates a charge in a state where the second floating diffusion region is reset or a charge according to incident light photoelectrically converted by the second photoelectric conversion element, charges accumulated in the first capacitor and the second capacitor are held in a same frame even after being read, and the third capacitor accumulates a charge in a state where the second floating diffusion region is reset within one frame period, and then accumulates a charge according to incident light photoelectrically converted by the second photoelectric conversion element.

14. The camera system according to claim 1, wherein the control section shifts a timing at which the first imaging element samples a charge according to incident light photoelectrically converted by first photoelectric conversion elements in at least some first pixel circuits among the plurality of first pixel circuits within the same frame period from a timing at which the second imaging element samples a charge according to incident light photoelectrically converted by second photoelectric conversion elements in at least some second pixel circuits among the plurality of second pixel circuits within the same frame period from each other.

15. The camera system according to claim 14, wherein the control section shifts a timing at which the first imaging element samples a reset level charge in at least some first pixel circuits among the plurality of first pixel circuits within the same frame period, a timing at which the first imaging element samples a charge according to incident light photoelectrically converted by the first photoelectric conversion element, a timing at which the second imaging element samples a reset level charge in at least some second pixel circuits among the plurality of second pixel circuits within the same frame period, and a timing at which the second imaging element samples a charge according to incident light photoelectrically converted by the second photoelectric conversion element from each other.

16. The camera system according to claim 1, wherein the control section shifts a timing at which the first imaging element outputs a pixel signal from at least some first pixel circuits among the plurality of first pixel circuits within the same frame period and a timing at which the second imaging element outputs a pixel signal from at least some second pixel circuits among the plurality of second pixel circuits within the same frame period from each other.

17. The camera system according to claim 16, wherein the control section causes at least some first pixel circuits among the plurality of first pixel circuits to output a pixel signal within the same frame period, and then causes at least some second pixel circuits among the plurality of second pixel circuits to output a pixel signal within the same frame period.

18. The camera system according to claim 1, wherein the plurality of first pixel circuits is arranged in each of a first direction and a second direction, the plurality of second pixel circuits is arranged in each of the first direction and the second direction, and when outputting a pixel signal within the same frame period, the first imaging element and the second imaging element alternately output a pixel signal for each pixel group arranged in the second direction.

19. The camera system according to claim 1, wherein the first imaging element and the second imaging element have a same number of pixels, and the first imaging element and the second imaging element perform exposure at a same exposure timing.

20. A control method for a camera system comprising: a first imaging element including a plurality of first pixel circuits that simultaneously samples charges according to incident light photoelectrically converted in each pixel and reads out the charges sampled in a non-destructive manner;

a second imaging element including a plurality of second pixel circuits that simultaneously samples charges according to incident light photoelectrically converted in each pixel and reads out the charges sampled in a non-destructive manner; and a control section that controls the first imaging element and the second imaging element, wherein the first imaging element switches whether or not to output a pixel signal from at least some first pixel circuits among the plurality of first pixel circuits within a same frame period on a basis of a pixel signal output from some of the first pixel circuits or some of the second pixel circuits for each frame period, and the second imaging element switches whether or not to output a pixel signal from at least some second pixel circuits among the plurality of second pixel circuits within a same frame period on a basis of a pixel signal output from the some first pixel circuits or the some second pixel circuits for each frame period.

* * * * *